US006969027B2

(12) United States Patent
Ishiba

(10) Patent No.: US 6,969,027 B2
(45) Date of Patent: Nov. 29, 2005

(54) VERTICAL TAKEOFF AND LANDING APPARATUS

(75) Inventor: Masatsugu Ishiba, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/810,836

(22) Filed: Mar. 29, 2004

(65) Prior Publication Data

US 2005/0151002 A1    Jul. 14, 2005

(30) Foreign Application Priority Data

Apr. 2, 2003  (JP) ............................. 2003-099540

(51) Int. Cl.⁷ ............................................. B64C 11/00
(52) U.S. Cl. ....................... 244/23 C; 244/12.2; 244/21
(58) Field of Search ............................. 244/12.2, 12.5, 244/12.11, 17.11, 21, 23 C, 23 B, 23 D, 244/23 A

(56) References Cited

U.S. PATENT DOCUMENTS

| | | | | |
|---|---|---|---|---|
| 2,443,936 A | * | 6/1948 | Stalker ..................... | 244/17.11 |
| 2,847,173 A | * | 8/1958 | McCarty, Jr. ............. | 244/17.11 |
| 2,953,320 A | * | 9/1960 | Parry ........................ | 244/12.2 |
| 2,953,321 A | * | 9/1960 | Robertson ................. | 244/23 C |
| 3,045,951 A | * | 7/1962 | Zalles ....................... | 244/23 C |
| 3,085,770 A | * | 4/1963 | Sutton ....................... | 244/23 B |
| 3,138,950 A | * | 6/1964 | Lovett, Jr. ................. | 244/23 C |
| 3,243,146 A | * | 3/1966 | Clover ...................... | 244/23 C |
| 3,365,149 A | * | 1/1968 | Willis ........................ | 244/23 C |
| 3,381,917 A | * | 5/1968 | Moore et al. .............. | 244/4 A |
| 3,395,876 A | * | 8/1968 | Green ....................... | 244/23 C |
| 3,432,120 A | * | 3/1969 | Guerrero ................... | 244/12.2 |
| 3,559,922 A | * | 2/1971 | Gluhareff ................. | 244/17.17 |
| 3,568,955 A | * | 3/1971 | Mc Devitt ................ | 244/23 C |
| 3,662,973 A | * | 5/1972 | Paine et al. ............... | 244/23 A |
| 4,023,751 A | * | 5/1977 | Richard .................... | 244/23 C |
| 4,071,206 A | * | 1/1978 | Magill ...................... | 244/17.11 |
| 4,149,689 A | * | 4/1979 | McDonald ................ | 244/53 B |
| 4,193,568 A | * | 3/1980 | Heuvel ..................... | 244/23 C |
| 4,194,707 A | * | 3/1980 | Sharpe ......................... | 244/9 |
| 4,203,566 A | * | 5/1980 | Lord ............................ | 244/57 |
| 4,447,024 A | * | 5/1984 | Williams .................. | 244/23 A |
| 4,457,476 A | * | 7/1984 | Andresevitz .............. | 244/23 C |
| 4,824,048 A | * | 4/1989 | Kim .......................... | 244/12.2 |

(Continued)

FOREIGN PATENT DOCUMENTS

JP          11-115896          4/1999

*Primary Examiner*—Harvey E. Behrend
*Assistant Examiner*—S. A. Holzen
(74) *Attorney, Agent, or Firm*—Finnegan, Henderson, Farabow, Garrett & Dunner, LLP

(57) ABSTRACT

A vertical takeoff and landing apparatus is excellent in the maneuverability and postural stability of its airframe, serves to protect a pilot from an impact when landing, and can make extremely stable flight when hovering near a building. An airframe has a propulsion device for generating propulsive force in a vertically upward direction, and a side wall surface surrounding the propulsion device. An air intake port has a plurality of divided air intake port sections formed on the side wall surface of the airframe. A duct part connects the air intake port sections and the propulsion device with one another. A shutter part is provided at each air intake port section for adjusting an amount of air flowing therein. A control unit adjusts the degree of opening of each shutter part in accordance with an operation of a control stick, so that the airframe can be moved in an arbitrary direction.

12 Claims, 29 Drawing Sheets

U.S. PATENT DOCUMENTS

| | | | |
|---|---|---|---|
| 5,106,035 A * | 4/1992 | Langford, III | 244/59 |
| 5,170,963 A * | 12/1992 | Beck, Jr. | 244/12.2 |
| 5,653,404 A * | 8/1997 | Ploshkin | 244/12.2 |
| 5,765,778 A * | 6/1998 | Otsuka | 244/101 |
| 5,779,188 A * | 7/1998 | Frick | 244/4 A |
| 5,895,011 A * | 4/1999 | Gubin | 244/12.1 |
| 6,179,247 B1 * | 1/2001 | Milde, Jr. | 244/23 A |
| 6,254,032 B1 * | 7/2001 | Bucher | 244/12.2 |
| 6,371,406 B1 * | 4/2002 | Corcoran | 244/12.2 |
| 6,568,635 B2 * | 5/2003 | Carpenter | 244/82 |
| 6,793,174 B2 * | 9/2004 | Ouellette et al. | 244/23 B |
| 6,824,097 B1 * | 11/2004 | Ouellette et al. | 244/23 B |
| 6,845,942 B2 * | 1/2005 | Paul | 244/12.2 |
| 2003/0098388 A1 * | 5/2003 | Walmsley | 244/12.2 |
| 2004/0118972 A1 * | 6/2004 | Ouellette et al. | 244/23 B |

* cited by examiner

WHEN MOVING FORWARD

WHEN MOVING BACKWARD

FORWARD

WHEN MOVING TO THE RIGHT

FORWARD

WHEN MOVING TO THE LEFT

VERTICAL TAKEOFF AND LANDING APPARATUS

BACKGROUND OF THE INVENTION

1. Field of the Invention

The present invention relates to a vertical takeoff and landing apparatus, and more particularly, to a small one capable of carrying a few persons thereon.

2. Description of the Related Art

Dangerous places such as disaster sites or the like for people to access can be explored or surveyed by using an unmanned flying craft or vehicle as described in a first patent document (Japanese Patent Application Laid-Open No 11-115896) for example. Such a flying craft has a rotary blade or blades, and is able to perform motions such as horizontal movements, vertical movements, rotation in the yaw direction, etc. Accordingly, it is considered that a variety of kinds of information can be gathered by using such a flying craft as required.

Even in this case, however, minute counteractive actions or effective countermeasures might not sometimes be able to be taken unless someone actually visits the site to be surveyed. Thus, the development of a safe, easy-to-operate, small flying machine capable of being used for manned flight in such a case is earnestly desired.

On the other hand, as a vertical takeoff and landing apparatuses carrying one-person thereon, there have hitherto been known a rocket belt, which was used in the demonstration of the Los Angeles Olympics in 1984, a millennium jet (trade name: Solo Trek) employing a reciprocating engine, etc.

These apparatuses had unique airframes or bodyworks different from those of aircrafts in general, and they were constructed in a manner as to be worn by a person. That is, the rocket belt is a backpack type small device, and is constructed such that pipes such as rocket jet nozzles are exposed or extended from the right and left sides thereof, so that it can make flight by injecting high pressure gases obtained through oxidization of hydrogen peroxide from these nozzles.

The millennium jet is larger in size than the rocket belt as mentioned above, and is equipped with a takeoff and landing gear such as wheels, etc., and is constructed such that an operator or pilot gets on board by fitting oneself into the inside of its upright airframe. In addition, propellers of a relatively large size are arranged at the upper right and left sides above the pilot's head, so that they are driven to revolve by means of a reciprocating engine, thereby making the airframe take off the ground. In this form of flying vehicle or craft using the reciprocating engine, fuel mileage is good, enabling a flight of about two hours.

Moreover, as a further form, there is a disk type device (i.e., model name VZ-1) developed by Bell Aerospace Co., in which an operator or pilot gets on the thin, columnar main body of its airframe with a built-in propeller propulsion device.

The one-person vertical takeoff and landing apparatuses as described above do not have selfstability or autostability such as that of airplanes or helicopters, so the flight posture or attitude thereof collapses or changes greatly if posture or attitude control is not carried out.

Therefore, in the past, in order to hold the flight posture of such a flying craft in a good condition, the pilot had to intentionally move his body so as to change the position of the center of gravity of the craft in an appropriate manner. That is, the pilot maneuvered the flying craft in the following manner. That is, in order for the craft to hover in the air, the pilot shifted his weight or center of gravity to the side opposite to the direction in which the airframe of the craft tilts, so as to correct the tilt, and in addition, when the pilot wanted to go in any arbitrary direction, he moved his weight or body toward that direction.

However, the method of shifting the body or weight of the pilot is extremely low in response, so it is impossible to perform detailed or minute attitude control. In addition, there arises a characteristic that the airframe is caused to momentarily move, due to a reaction generated in the course of the movement of the body or weight, in a direction opposite to the direction in which it should be originally controlled to be moved. Thus, the control due to the body or weight shift lacks practical use, and its improvement is desired.

In the conventional manned apparatuses as referred to above, it is necessary to solve the following problems.

Firstly, since there is provided no means for protecting passengers at the time of emergency landing or the like, it is necessary to obviate the fear of passenger injuries even in a small accident.

Secondly, since they are constructed such that a propeller slipstream and an air intake port are oriented directly toward the pilot, an extremely strong wind will blows against the pilot while flying. Therefore, in case of low temperatures or the like, the temperature of the pilot will be rapidly deprived so that the pilot might sometimes be subjet to frostbite, etc. Accordingly, it is required to improve such a situation.

Thirdly, since a fuel tank is fixedly attached to the airframe, the fuel in the fuel tank is caused to move due to the tilting of the airframe, so that a defective or poor fuel supply might be caused or the fuel might be left in the fuel tank without being fully used up. Thus, fuel control is important in view of the limited flight time of small flying crafts.

Fourthly, in cases where a flying craft is hovering near a building, it is likely to make contact with or too far away from the building because of the influences of the instability factor of the airframe itself, crosswinds and the like. This is a serious problem in fire rescue operations in high-rise buildings, etc., and improvements thereof are strongly required.

SUMMARY OF THE INVENTION

Accordingly, the present invention is intended to solve the problems as referred to above, and has for its object to provide a vertical takeoff and landing apparatus which is excellent in the maneuverability and the postural stability of an airframe, and has the function of protecting a pilot from the impact of an accident, and is capable of stable flight when hovering near a building, while eliminating any fear of defective or poor fuel supply or fuel remaining unused.

A vertical takeoff and landing apparatus according to the present invention is constructed in the following manner so as to solve the above-mentioned technical object.

In a first aspect of the present invention, there is provided a vertical takeoff and landing apparatus comprising: an airframe having a propulsion device for generating propulsive force in a vertically upward direction, and a side wall surface surrounding the propulsion device; an air intake port having a plurality of divided air intake port sections formed on the side wall surface of the airframe; a duct part connecting the air intake port sections and the propulsion device with one another; a plurality of shutter parts each provided at a corresponding one of the air intake port sections for adjusting an amount of air flowing therein; and a control unit for adjusting the degree of opening of each of the shutter parts in accordance with an operation of a control stick.

In the vertical takeoff and landing apparatus according to the first aspect of the present invention, the airframe is caused to float by operating the propulsion device, and when the direction of travel of the airframe is desired to be changed in its floating state, the degree of opening of a shutter part located in that direction is increased.

In a second aspect of the present invention, there is provided a vertical takeoff and landing apparatus comprising: an airframe having a propulsion device for generating propulsive force in a vertically upward direction, and a side wall surface surrounding the propulsion device; an air intake port having a plurality of air intake port sections formed on the side wall surface of the airframe; a duct part connecting the air intake port sections and the propulsion device with one another; a plurality of plates of an airfoil cross section each provided at a corresponding one of the air intake port sections for adjusting an amount of air flowing therein; a plurality of pairs of support members each provided at both ends of a corresponding one of the plates for rotatably supporting the corresponding plate; a plurality of pairs of actuators each for driving the both ends of a corresponding one of the plates thereby to individually make variable an angle of attack and an angle of tilt thereof; and a control unit for adjusting an amount of operation of each actuator in accordance with an operation of a control stick.

In the vertical takeoff and landing apparatus according to the second aspect of the present invention, a lift force acting on a plate can be generated by intake or sucked air passing around that plate, so that the airframe can be driven to move in an arbitrary direction under the action of this lift force.

In a preferred form, the vertical takeoff and landing apparatus according to the first or second aspect of the present invention may further comprise: an annular storage member disposed to surround a pilot who gets on board an upper surface of the airframe; an airbag received in the storage member; a gas generator for generating a high pressure gas which is to be supplied to the airbag so as to inflate it; a valve for controlling the high pressure gas to be supplied from the gas generator to the airbag; and a sensor for detecting the state of movement of the airframe and generating an output signal representative of the state of movement thus detected to the control unit; wherein the control unit further controls the valve based on the output signal from the sensor in such a manner that the valve is opened to supply the high pressure gas to the airbag for inflation thereof.

In another preferred form, the vertical takeoff and landing apparatus according to the first or second aspect of the present invention may further comprise: a landing airbag provided at a lower surface side of the airframe; a gas generator for generating a high pressure gas which is to be supplied to the landing airbag so as to inflate it; a valve for controlling the high pressure gas to be supplied from the gas generator to the landing airbag; and a sensor for detecting the state of movement of the airframe and generating an output signal representative of the state of movement thus detected to the control unit; wherein the control unit further controls the valve based on the output signal from the sensor in such a manner that the valve is opened to supply the high pressure gas to the landing airbag for inflation thereof.

Preferably, in these cases, the gas generator may be a high pressure tank containing therein a high pressure gas. In addition, high pressure gas may be an extraction gas obtained from the propulsion device, or it may be a high pressure gas produced by gunpowder.

In a further preferred form, the vertical takeoff and landing apparatus according to the first or second aspect of the present invention may further comprise: a fuel tank attached to the airframe; and a variable support part for supporting a held position of the fuel tank at least three points in a variable manner; wherein the control unit further controls the variable support part in such a manner that the fuel tank is held at an arbitrary angle so as to induce the fuel in the fuel tank to a specific position therein to facilitate the fuel supply. In this case, the variable support part further may have a function of metering an amount of fuel in the fuel tank, and the control unit controls the variable support part based on the amount of fuel metered by the variable support part in such a manner that the fuel tank is held at an arbitrary angle.

According to this arrangement, the fuel in the fuel tank can be fully used up, and the pilot can exactly know the amount of fuel remaining in the fuel tank, thus making it easy to perform flight control.

In a still further preferred form, the vertical takeoff and landing apparatus according to the first or second aspect of the present invention may further comprise: a plurality of wheels provided at a lower side of the airframe for supporting the airframe in a manner as to enable it to travel; and a plurality of turbines each attached to an inner side of a corresponding one of the wheels and adapted to be rotated by a gas supplied thereto to drive the wheels to rotate; wherein the propulsion device comprises an engine of a type capable of generating a high pressure gas, and the apparatus further comprises a gas distribution system for distributing the high pressure gas from the propulsion device so as to supply it to the plurality of turbines.

With this arrangement, the apparatus can travel on the ground, so the range of movement thereof can be expanded or increased, thus making the apparatus particularly suitable for disaster relief, etc.

In a yet further preferred form, the vertical takeoff and landing apparatus according to the first or second aspect of the present invention may further comprise wheels being held in such a manner that they can be extended in any of downward and side directions of the airframe; wherein when the airframe is caused to go up and down while being forced to approach a vertical wall existing outwardly of the airframe, the wheels are made to project in a side direction of the airframe so as to be placed in contact with the vertical wall.

This arrangement serves to stabilize the airframe mainly at the time of a high-rise building disaster such as a building fire, etc.

Preferably, in the vertical takeoff and landing apparatus according to the first or second aspect of the present invention, the propulsion device may comprise a propeller and a turbine to which the propeller is coupled, and wherein a high pressure gas is supplied to the turbine whereby the turbine is driven to rotate the propeller thereby to generate propulsive force. In this case, the high pressure gas may be a high pressure gas that is supplied by a high pressure gas generator disposed outside the propulsion device, or a high pressure gas extracted from a jet engine or a detonation pulse engine. In addition, streams of air sucked from the plurality of air intake port sections may be merged with one another at a location upstream of the propeller.

Preferably, in the vertical takeoff and landing apparatus according to the first or second aspect of the present invention, the propulsion device may comprise either one of a jet engine, a turbo fan engine, a motor which is adapted to be driven to operate by means of a fuel cell and has a propeller or a fan coupled with its output shaft, and an internal combustion engine which has a propeller or a fan coupled with its output shaft.

Particularly, it is considered that, assuming that an external driving source for the high pressure gas is stopped or that a driving source for the high pressure gas built in the vertical takeoff and landing apparatus is stopped, a high pressure gas tank is interposed between the drive unit and the driving source, so that in such an emergency, the high pressure gas can be supplied from the high pressure gas tank to the drive unit.

Preferably in the vertical takeoff and landing apparatus according to the first or second aspect of the present invention, each of the air intake port sections may be covered with a net member. According to such an arrangement, accidents such as a defective operation due to the suction or inhalation of foreign matters can be prevented in advance.

A flying machine having a person transportation function according to the present invention is excellent in maneuverability and postural stability, has the function of protecting the pilot, and is able to make extremely stable flight even in case of hovering near a building.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
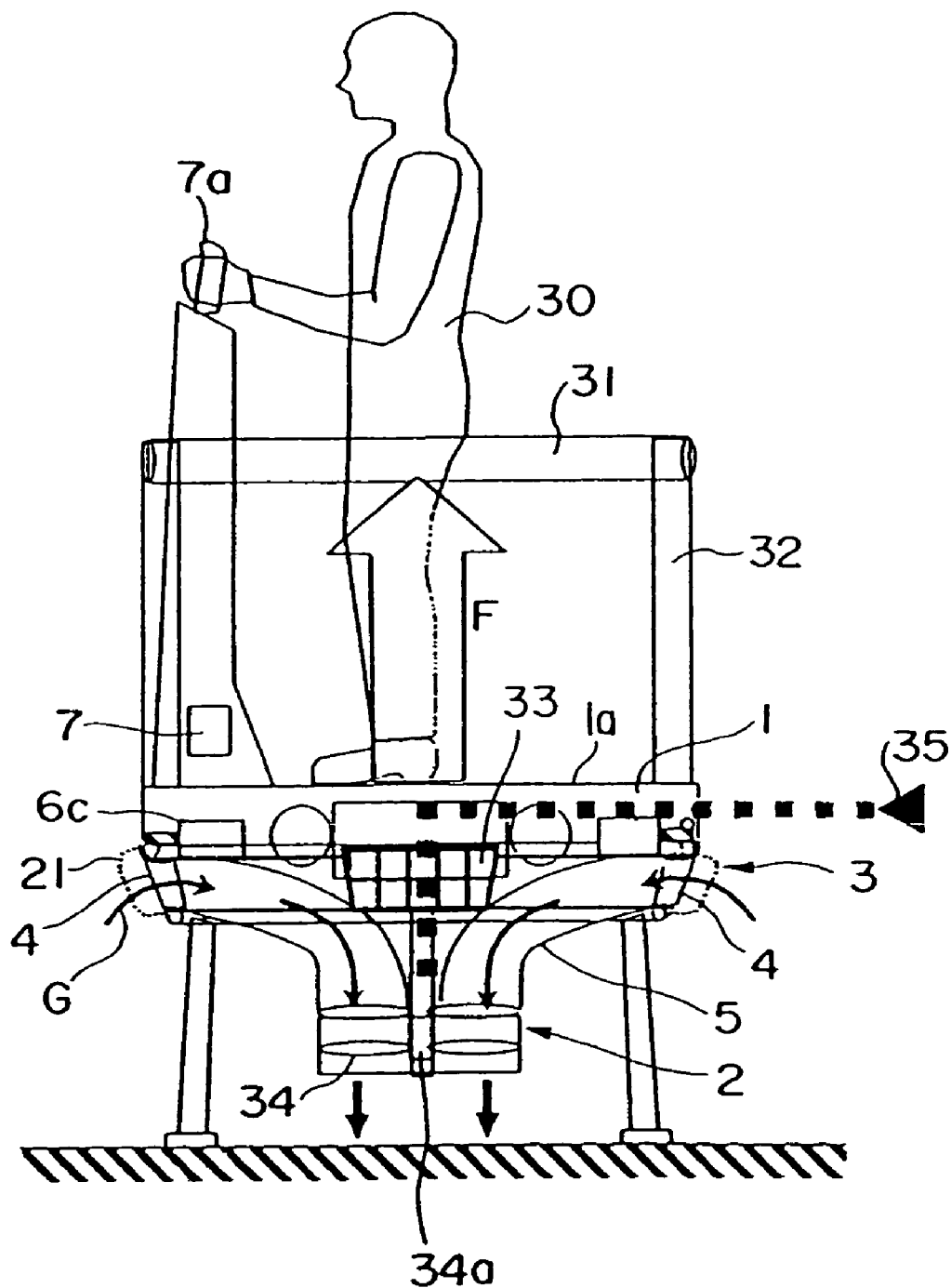
FIG. 1 is a cross sectional view showing a vertical takeoff and landing apparatus according to a first embodiment of the present invention.

Hereinafter, preferred embodiments of the present invention will be described in detail while referring to accompanying drawings including FIG. 1 through FIG. 47.

Embodiment 1

First, a vertical takeoff and landing apparatus according to a first embodiment of the present invention will be described while referring to FIG. 1 through FIG. 15.

This vertical takeoff and landing apparatus is suitable for use with one person, and has its body or airframe 1 formed into substantially a disk-shaped configuration. The airframe 1 has an upper surface 1a in the form of a flat surface, on which an operator or pilot 30 can stand for controlling the apparatus. A plurality of poles 32 are arranged upright on the upper surface 1a of the airframe 1, with a guard ring 31 of an annular shape being mounted on a tip end of each pole 32. This guard ring 31 is provided for protecting the pilot 30 and preventing him from falling off from the airframe 1.

A propulsion device 2 for generating propulsive force F in a vertically upward direction is arranged in the center of and the inside of the airframe 1. This propulsion device 2 can be adopted either of an externally driven type propulsion system in which driving power is derived from the outside, and an internally driven type propulsion system in which an engine is installed inside the propulsion device 2. In this first embodiment, the propulsion device 2 is constructed such that a main turbine 33 is coupled with propellers 34 by means of a shaft 34a, so that the main turbine 33 is driven to rotate by supplying thereto a high pressure gas 35 from the outside, whereby the propeller 34 is caused to rotate through the shaft 34a, thus generating propulsive force F.

The high pressure gas 35 from the outside is supplied, for example, by an unillustrated supply device which will be described below.

This supply device includes a hydrogen peroxide tank, a pressurization tank connected to the hydrogen peroxide tank, and a catalyst connected to the hydrogen peroxide tank. Nitrogen is filled into the pressurization tank, so that it pressurizes the hydrogen peroxide stored in the hydrogen peroxide tank to pressure feed it to the catalyst. Here, samarium silver is used as the catalyst.

The high pressure gas 35, being generated by the reaction of the hydrogen peroxide and the catalyst, is sent to the main turbine 33, which is thereby driven to rotate the propeller 34.

Figure 2:
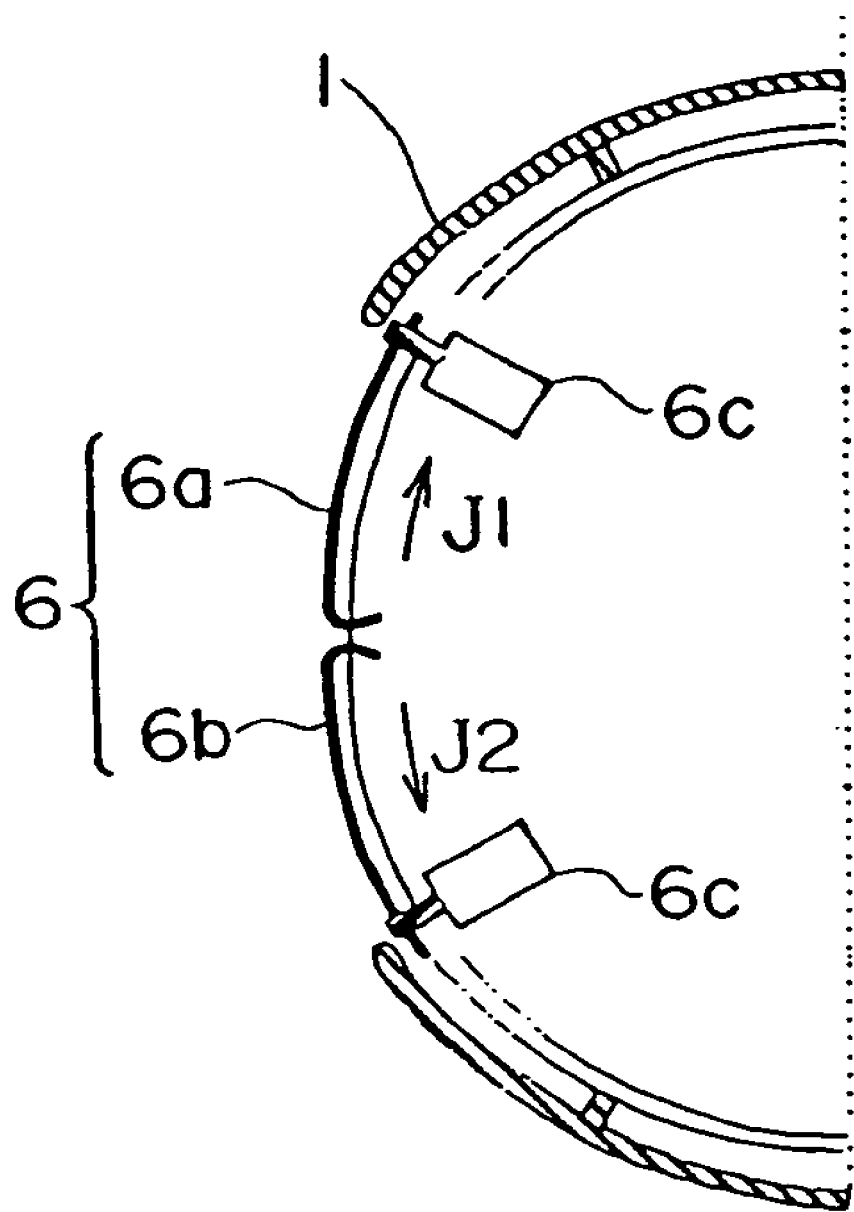
FIG. 2 is a partial plan view showing a shutter part of the vertical takeoff and landing apparatus.
Figure 3:
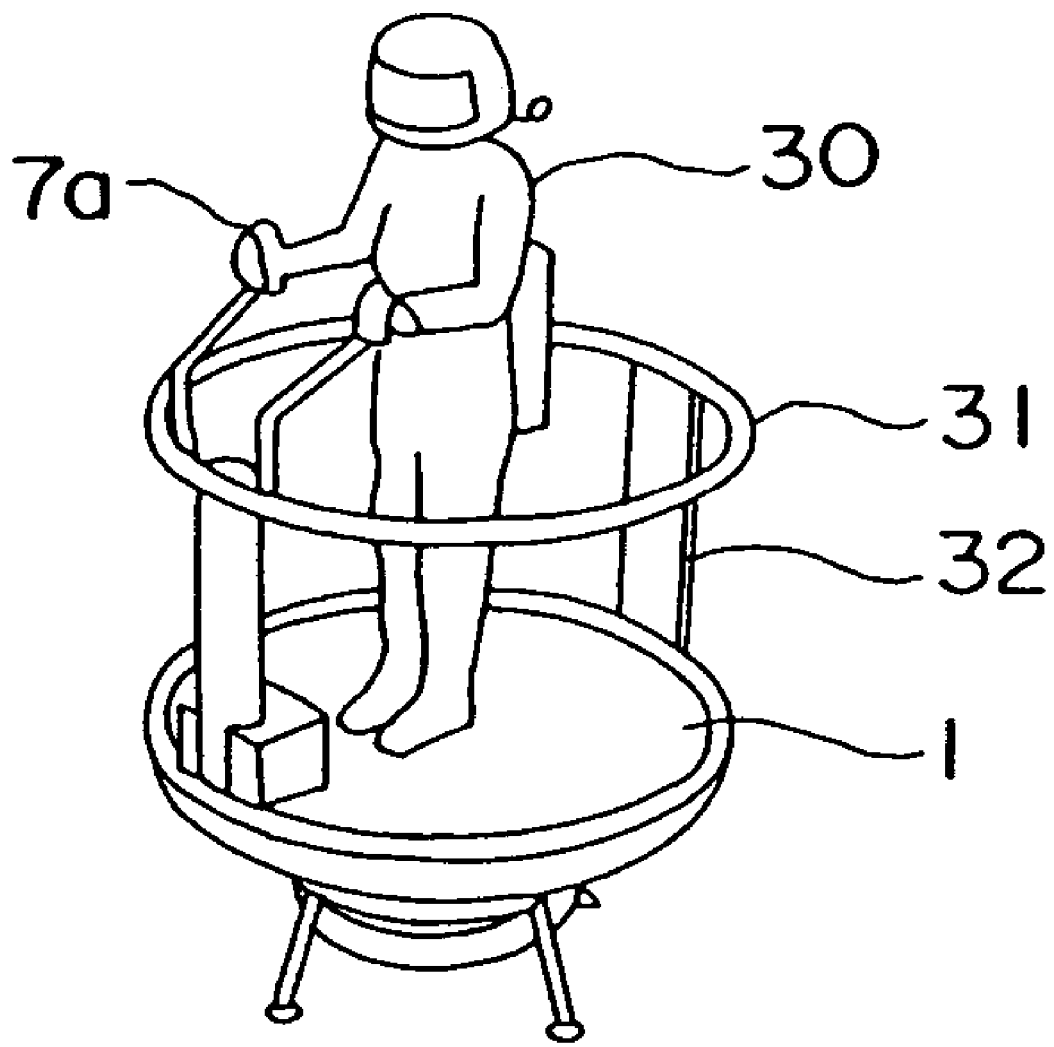
FIG. 3 is a perspective view showing the state in which a pilot is on board the vertical takeoff and landing apparatus.

On the other hand, an air intake port 4 is formed on a side wall surface 3 of the airframe 1. This air intake port 4 is circularly arranged to open over an angle of 360 degrees, and here it is equally divided into four sections. At each section of the air intake port 4, there is arranged a shutter part 6 for adjusting the amount of air flowing into a corresponding air port section, as shown in FIG. 2. This shutter part 6 comprises a plate-like member curving along the side wall surface 3 of the airframe 1, and is divided into a pair of right and left shutter members 6a, 6b at the center of the air intake port 4. The individual shutter members 6a, 6b can be caused to slide in directions indicated by arrows J1, J2, respectively, by means of drive motors 6c installed inside the airframe 1 so as to open the air intake port 4, and they can also be moved in the opposite directions so as to close the air intake port 4.

There are a total of four sets of shutter parts 6 which are arranged in an equally spaced apart relation with respect to one another at an angular interval of 90 degrees in such a manner that they can be individually controlled to be opened and closed independently of one another.

The air intake port 4 and the propellers 34 are connected with each other by means of duct parts 5 which are each formed to curve downwardly from their side to outer end so as to reduce their resistance to air passing therethrough. With such an arrangement, airstreams flowing in directions indicated by arrow G are generated to provide propulsive force F, as shown in FIG. 1.

Figure 15:
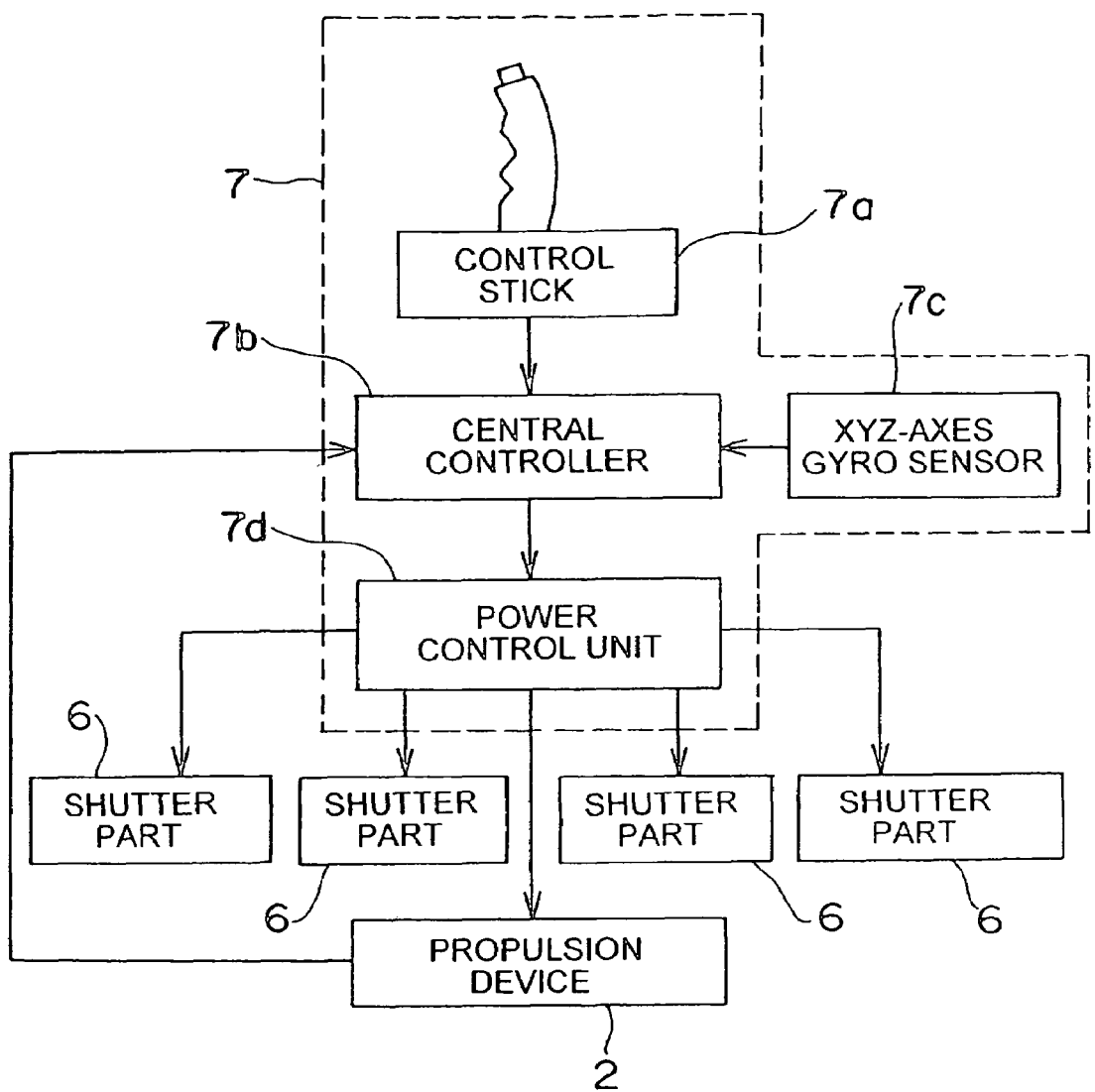
FIG. 15 is a block diagram of the vertical takeoff and landing apparatus according to the first embodiment.
Figure 16:
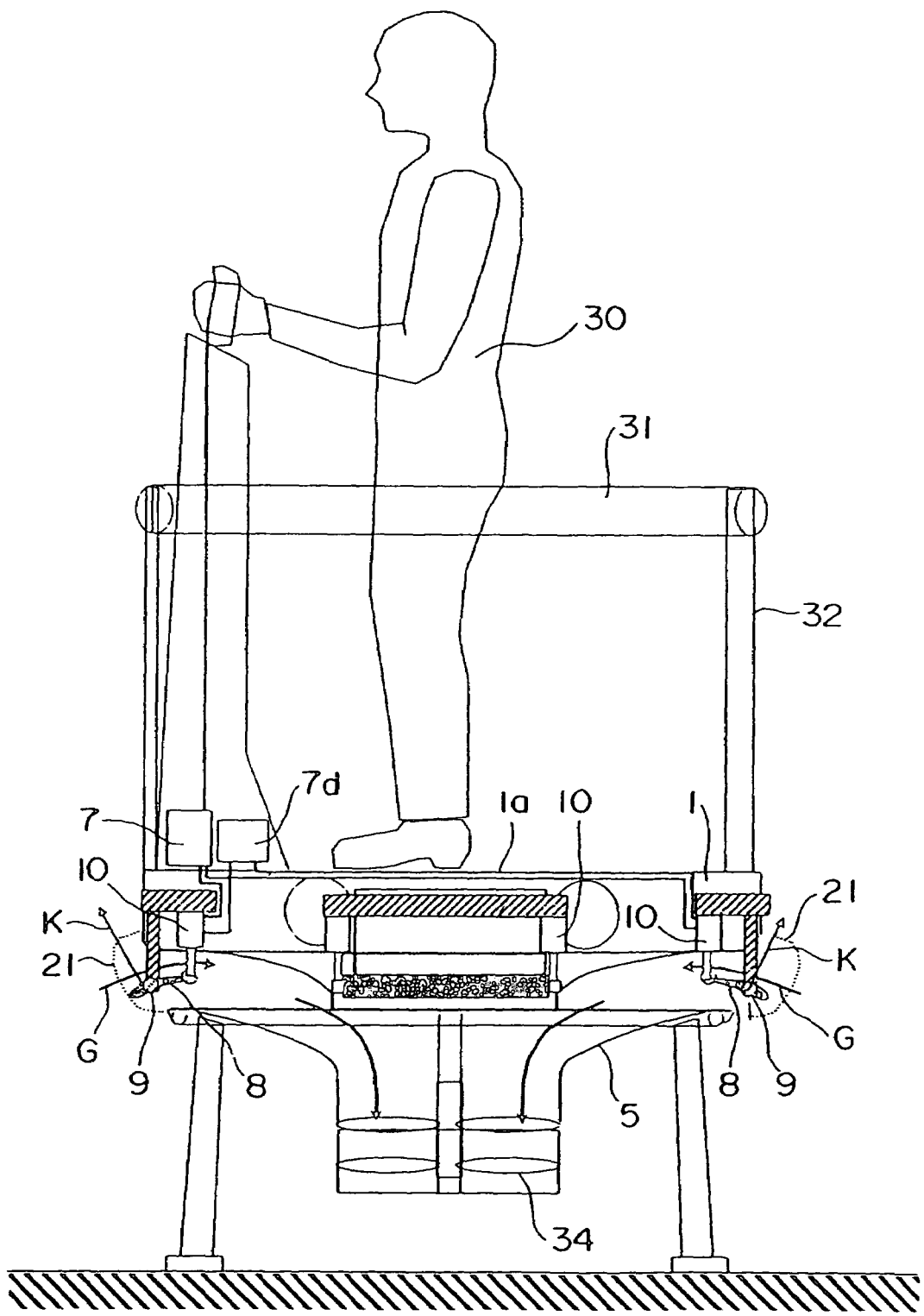
FIG. 16 is a cross sectional view showing a vertical takeoff and landing apparatus according to a second embodiment of the present invention.

The drive motors 6c of the shutter parts 6 are controlled by a control unit 7 in such a manner that the degree of opening of each shutter part 6 is adjusted according to the situation or operating condition of the apparatus. As shown in FIG. 15, the control unit 7 includes a control stick 7a operated by the pilot 30, a central controller 7b comprising a computer as a main component, and a power control unit 7d which is controlled by the central controller 7b. The power control unit 7d controls the individual shutter parts 6 so as to control the posture of the airframe 1 by controlling the drive motors 6c. The power control unit 7d further controls the propulsion device 2 so as to perform fine or minute power control at the time of hovering or the like. An output of an XYZ-axes gyro sensor 7c such as a laser gyro or the like is input to the central controller 7b. As a result, even in case of external disturbances such as crosswinds, the posture or attitude of the airframe 1 can be maintained without being intentionally controlled by the pilot 30.

Here, note that the propulsion device 2 can adopt, in addition to a single-propeller system employing a single propeller, a multiple-fan system (FIG. 4) having four propellers 100, a counter-rotating system (FIG. 5) employing counter-rotating propellers 101 to counterbalance or cancel the reaction forces of the propellers, a gimbal system (FIG. 6) capable of arbitrarily changing the axial direction of propellers 102 themselves, and composite systems using any possible combinations of the above three systems.

In the apparatus as constructed above, now reference will be made to the operation of the airframe 1 while referring to FIG. 7 through FIG. 14.

Figure 7:
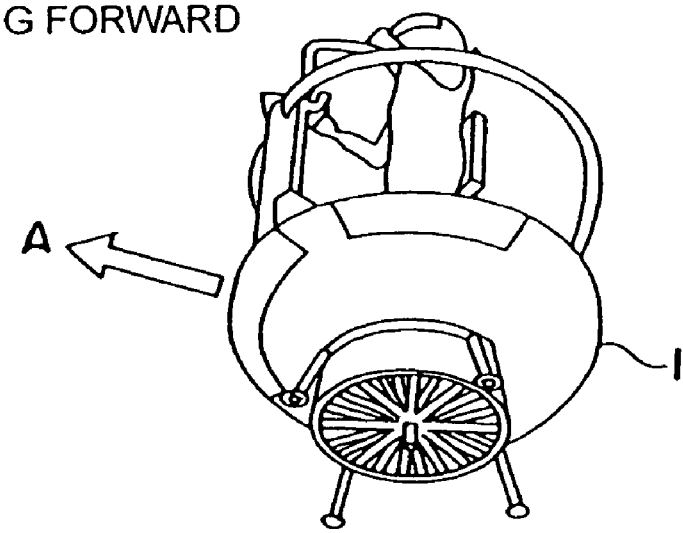
FIG. 7 is a perspective view showing the state in which the vertical takeoff and landing apparatus is moving forward.
Figure 8:
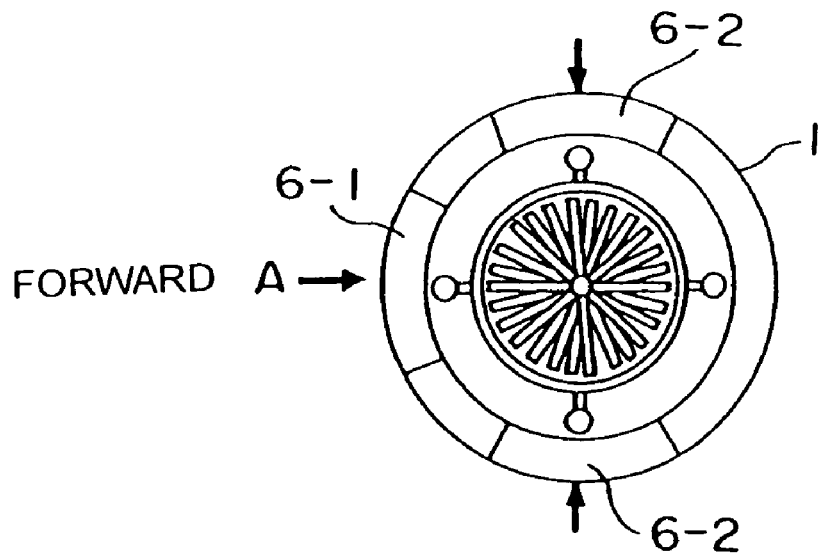
FIG. 8 is a bottom plan view showing the state in which the vertical takeoff and landing apparatus is moving forward.

FIG. 7 illustrates the case in which the apparatus is driven to move forward in a direction indicated by arrow A therein. In this case, by opening only a shutter part 6-1, which is located in a direction in which the apparatus travels, and other two shutter parts 6-2 arranged orthogonal to that shutter part 6-1, as shown in FIG. 8, the balance of intake air to be sucked from the air intake port 4 of the airframe 1 is intentionally broken, whereby the airframe 1 can be propelled to move forward in the direction indicated by arrow A.

Figure 9:
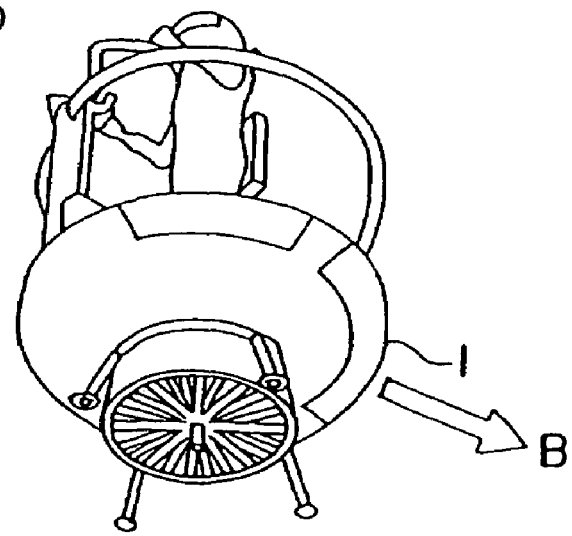
FIG. 9 is a perspective view showing the state in which the vertical takeoff and landing apparatus is moving backward.
Figure 10:
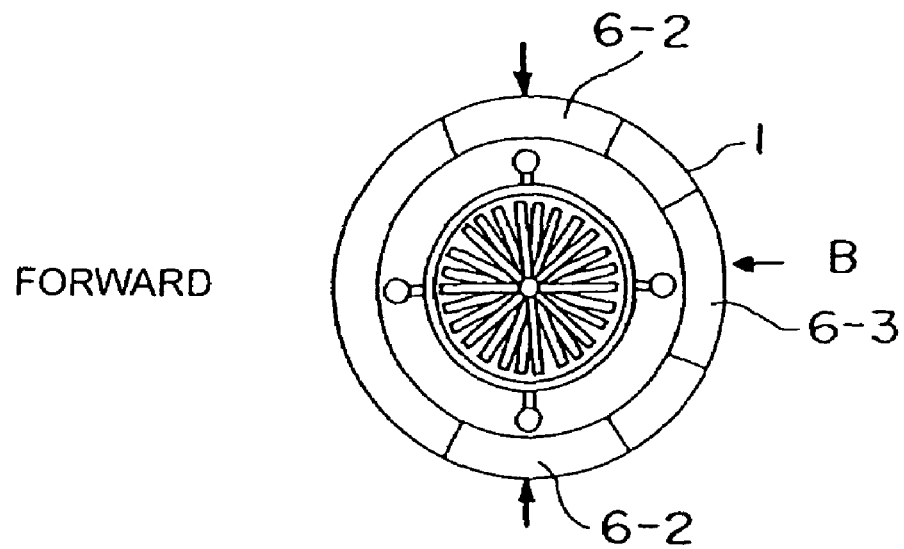
FIG. 10 is a bottom plan view showing the state in which the vertical takeoff and landing apparatus is moving backward.

FIG. 9 illustrates the case in which the apparatus is driven to move backward in a direction indicated by arrow B therein. In this case, by opening a shutter part 6-3, which is located in a direction in which the apparatus travels, and other two shutter parts 6-2 arranged orthogonal to that shutter part 6-3, as shown in FIG. 10, the balance of intake air to be sucked from the air intake port 4 of the airframe 1 is intentionally broken, whereby the airframe 1 can be propelled to move backward in the direction indicated by arrow B.

Figure 11:
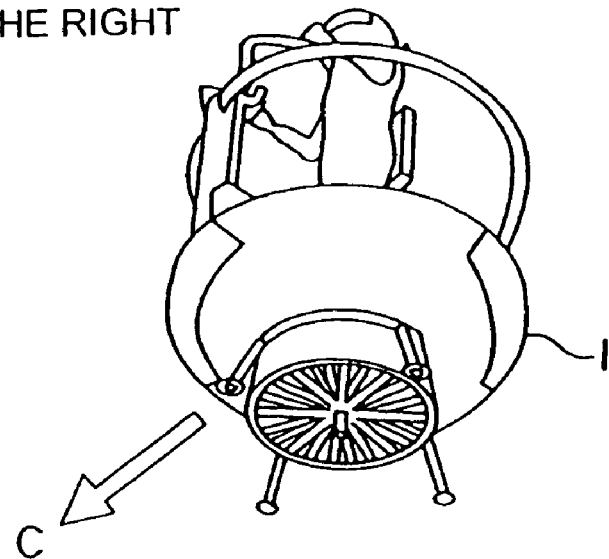
FIG. 11 is a perspective view showing the state in which the vertical takeoff and landing apparatus is moving to the right.
Figure 12:
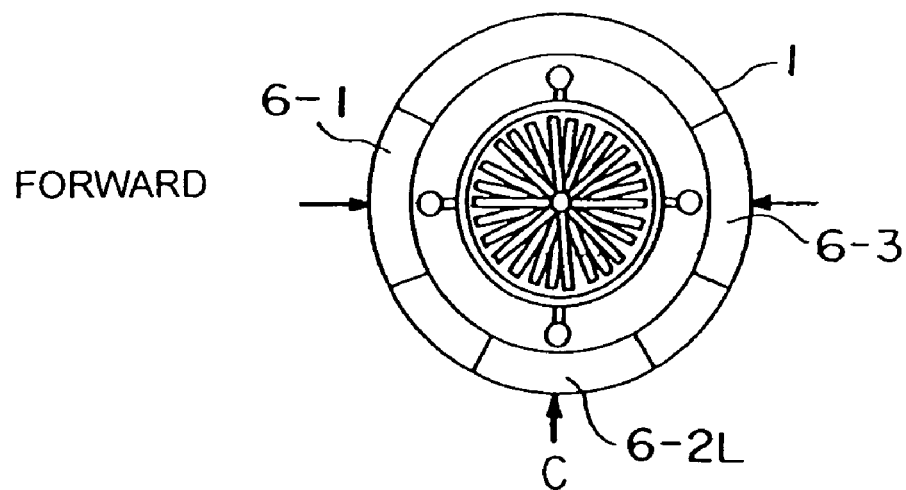
FIG. 12 is a bottom plan view showing the state in which the vertical takeoff and landing apparatus is moving to the right.

FIG. 11 illustrates the case in which the apparatus is driven to move to the right in a direction indicated by arrow C. In this case, by opening a shutter part 6-2L, which is located at the right side of the airframe 1, and other two shutter parts 6-1, 6-3 arranged orthogonal to that shutter part 6-2L, as shown in FIG. 12, the balance of intake air to be sucked from the air intake port 4 of the airframe 1 is intentionally broken, whereby the airframe 1 can be propelled to move to the right in the direction indicated by arrow C.

Figure 13:
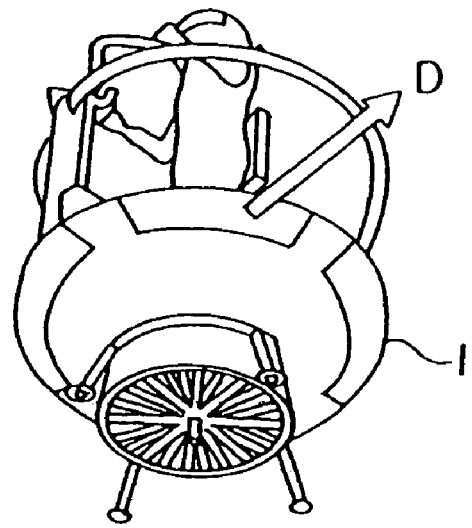
FIG. 13 is a perspective view showing the state in which the vertical takeoff and landing apparatus is moving to the left.
Figure 14:
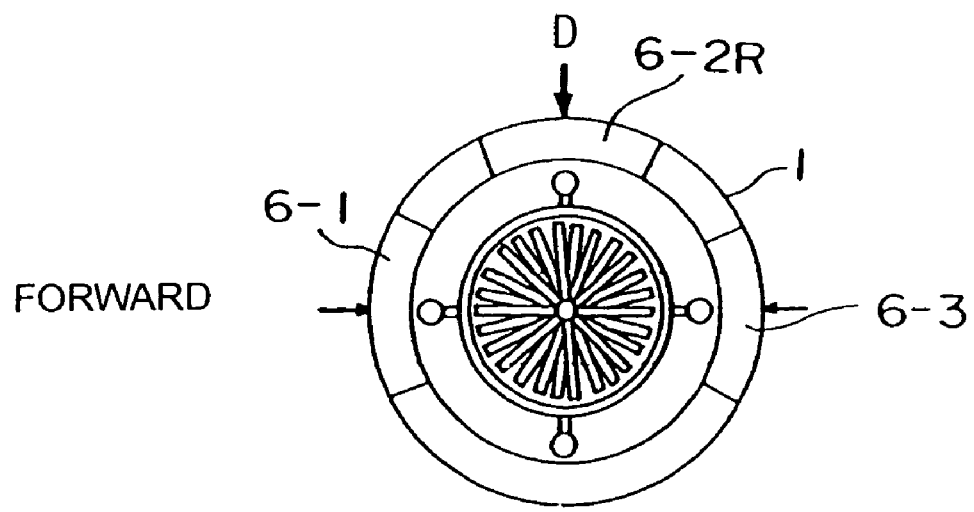
FIG. 14 is a bottom plan view showing the state in which the vertical takeoff and landing apparatus is moving to the left.

FIG. 13 illustrates the case in which the apparatus is driven to move to the left in a direction indicated by arrow D. In this case, by opening a shutter part 6-2R, which is located at the left side of the airframe 1, and other two shutter parts 6-1, 6-3 arranged orthogonal to that shutter part 6-2R, as shown in FIG. 14, the balance of intake air to be sucked from the air intake port 4 of the airframe 1 is intentionally broken, whereby the airframe 1 can be propelled to move to the left in the direction indicated by arrow D.

Figure 4:
FIG. 4 is a perspective view showing a multiple-fan system among propulsion systems for the vertical takeoff and landing apparatus.
Figure 5:
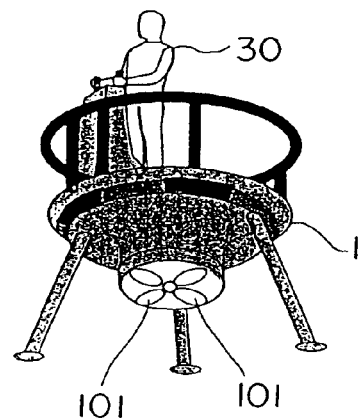
FIG. 5 is a perspective view showing a counter-rotating fan system among propulsion systems for the vertical takeoff and landing apparatus.
Figure 6:
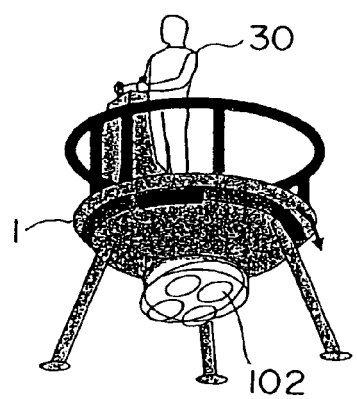
FIG. 6 is a perspective view showing a gimbal fan system among propulsion systems for the vertical takeoff and landing apparatus.

Here, note that in cases where the propulsion device 2 is constructed of a plurality of propulsion systems as shown in FIG. 4, even if a specific one of the systems is stopped or failed, the propulsive force produced by the propulsion device 2 will decrease but no disproportion in the propulsive force balance will be generated. Therefore, the apparatus is able to make safe landing. In addition, the sections of the air intake port 4 can be covered with net members 21, respectively, as shown in FIG. 1, whereby it is possible to prevent accidents such as inhalation of foreign matters, e.g., the inhalation of floating objects such as birds in the air greater than a predetermined size.

Embodiment 2

A second embodiment of the present invention will be described while referring to FIG. 16 through FIG. 28. In these figures, the same or corresponding parts of this embodiment as those of the first embodiment are identified by the same symbols while omitting an explanation thereof.

In this embodiment, a plate 8 of a wing or airfoil cross section is provided at each section of the air intake port 4 instead of each shutter part 6. An asymmetrical wing or airfoil of the Clark Y type or the like is suitable for each plate 8, which is provided at its both ends with a pair of support members 9 which are pivotally or rotatably supported on the both side walls of a corresponding section of the air intake port 4 so as to support this plate 8 at an arbitrary angle of attack. That is, each support member 9 is a universal pivot, and the plates 8 are arranged in such a manner that the angle of attack and the angle of tilt or inclination of each plate 8 can be individually changed by the expansion and contraction of actuators 10 connected with the both ends thereof.

The amount of operation and the direction of operation of each of these actuators 10 can be adjusted by the control unit 7, so that the lift force K of each plate 8 increases as the angle of attack thereof is increased, and the lift force K of each plate 8 decreases as the angle of attack thereof is decreased.

Figure 17:
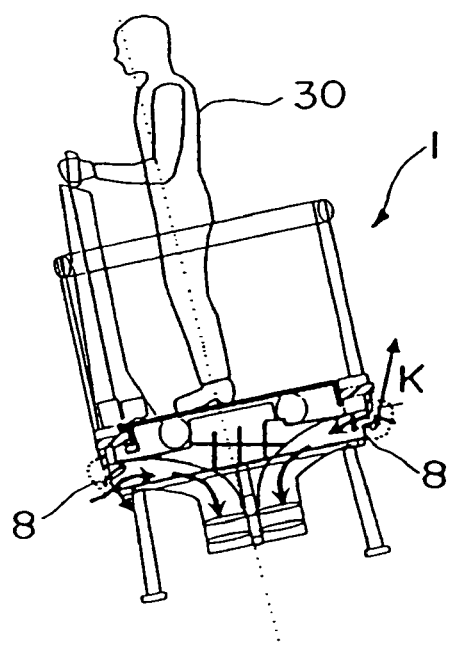
FIG. 17 is a side elevational view showing the state in which the vertical takeoff and landing apparatus according to the second embodiment is tilted.
Figure 18:
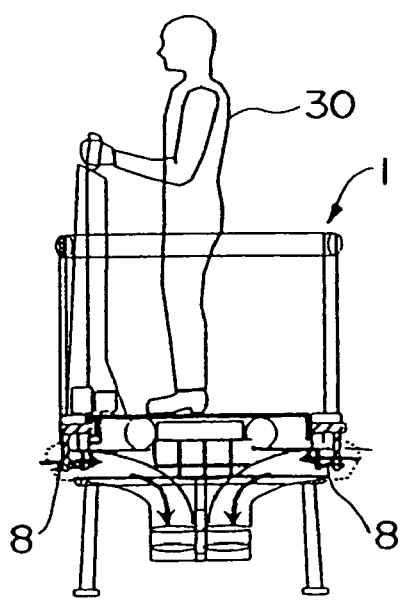
FIG. 18 is a side elevational view showing the state in which the vertical takeoff and landing apparatus according to the second embodiment maintains its horizontal state.
Figure 19:
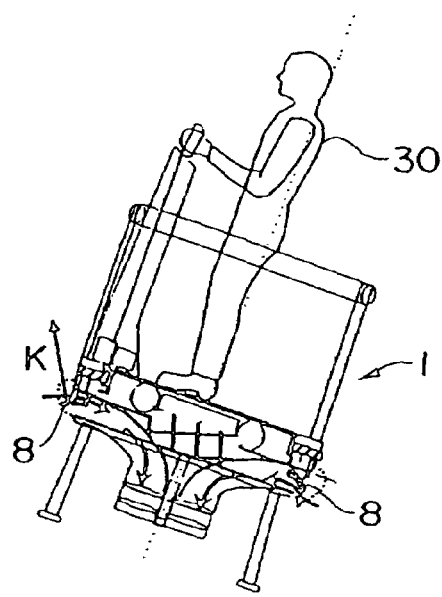
FIG. 19 is a side elevational view showing the state in which the vertical takeoff and landing apparatus according to the second embodiment is tilted backward.

That is, when the angle of attack of a plate 8 located rearwardly as viewed from the pilot 30 is made greater than the angle of attack of a plate 8 located forwardly, as shown in FIG. 17, the lift force of the rearwardly located plate 8 becomes greater than that of the forwardly located plate 8, whereby the airframe 1 is caused to move forward. On the other hand, when the angle of attack of the plate 8 located forwardly as viewed from the pilot 30 is made greater than the angle of attack of the plate 8 located rearwardly, as shown in FIG. 19, the lift force of the forwardly located plate 8 becomes greater than that of the rearwardly located plate 8, whereby the airframe 1 is caused to move backward. Further, when the angles of attack of the forwardly and rearwardly located plates 8 are made equal to each other, as shown in FIG. 18, the airframe 1 is caused to hovered.

Figure 20:
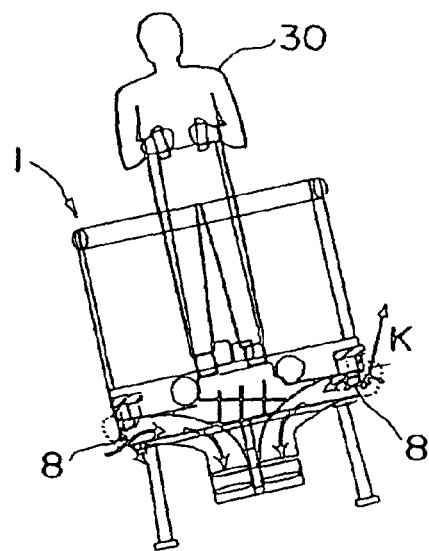
FIG. 20 is a front elevational view showing the state in which the vertical takeoff and landing apparatus according to the second embodiment is tilted to the right.
Figure 21:
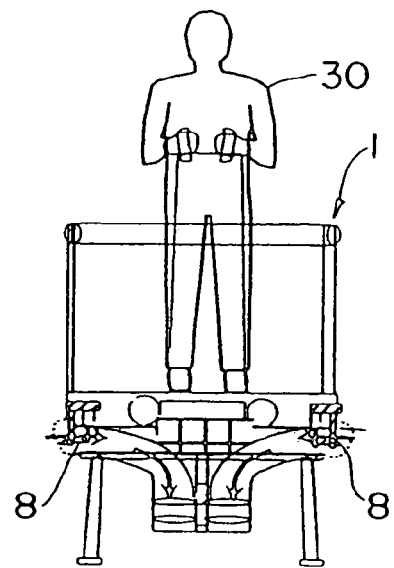
FIG. 21 is a front elevational view showing the state in which the vertical takeoff and landing apparatus according to the second embodiment maintains its horizontal state.
Figure 22:
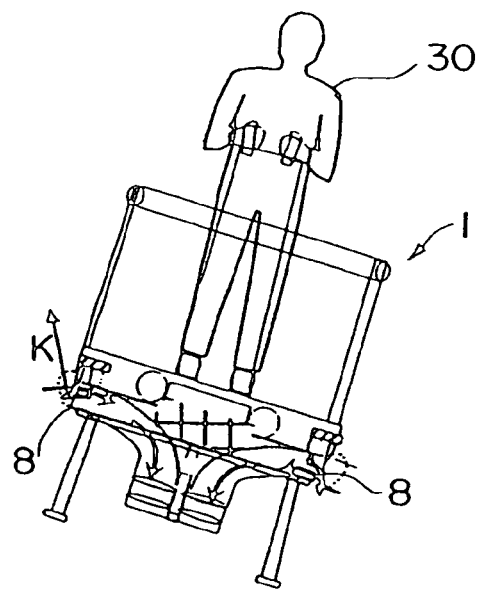
FIG. 22 is a front elevational view showing the state in which the vertical takeoff and landing apparatus according to the second embodiment is tilted to the left.

Similarly, when the angle of attack of the plate 8 located to the left as viewed from the pilot 30 is made greater than the angle of attack of the plate 8 located to the right, as shown in FIG. 20, the lift force of the leftwardly located plate 8 becomes greater than that of the rightwardly located plate 8, whereby the airframe 1 is caused to move to the right. On the contrary, when the angle of attack of the plate 8 located to the right as viewed from the pilot 30 is made greater than the angle of attack of the plate 8 located to the left, as shown in FIG. 22, the lift force of the rightwardly located plate 8 becomes greater than that of the leftwardly located plate 8, whereby the airframe 1 is caused to move to the left. In addition, when the angles of attack of the leftwardly and rightwardly located plates 8 are made equal to each other, as shown in FIG. 21, the airframe 1 is caused to hover.

The airframe 1 can be driven to move in an arbitrary direction by combining such operations.

Figure 23:
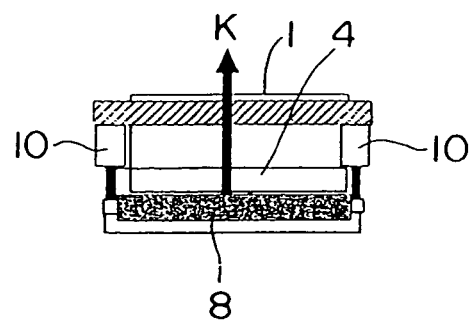
FIG. 23 is a side elevational view showing the state in which a plate of the vertical takeoff and landing apparatus according to the second embodiment is maintained at its horizontal state.
Figure 24:
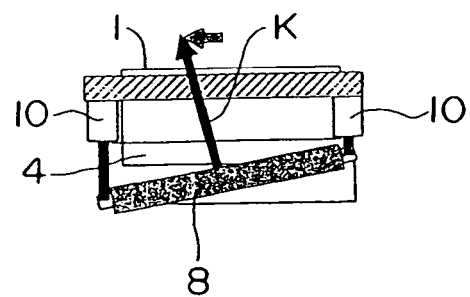
FIG. 24 is a side elevational view showing the state in which the plate of the vertical takeoff and landing apparatus is tilted to the left.
Figure 25:
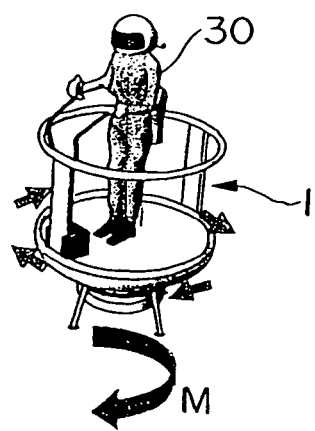
FIG. 25 is a perspective view showing the state in which the vertical takeoff and landing apparatus according to the second embodiment rotates in the clockwise direction.
Figure 26:
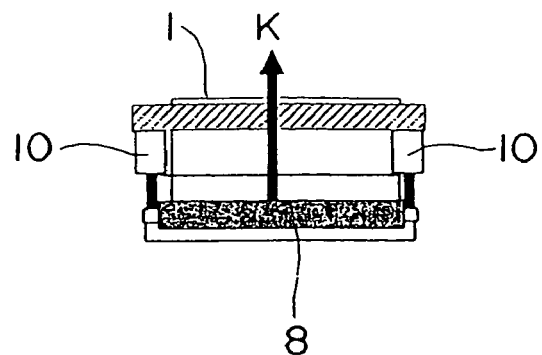
FIG. 26 is a side elevational view showing the state in which the plate of the vertical takeoff and landing apparatus is maintained at its horizontal state.
Figure 27:
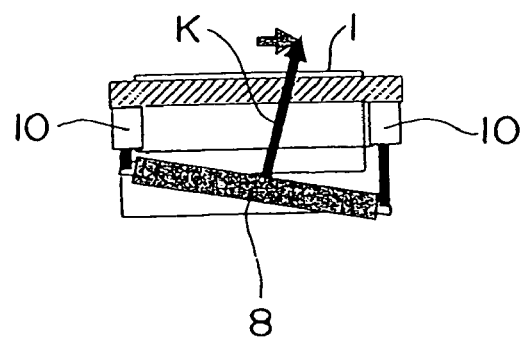
FIG. 27 is a side elevational view showing the state in which the plate of the vertical takeoff and landing apparatus is tilted to the right.
Figure 28:
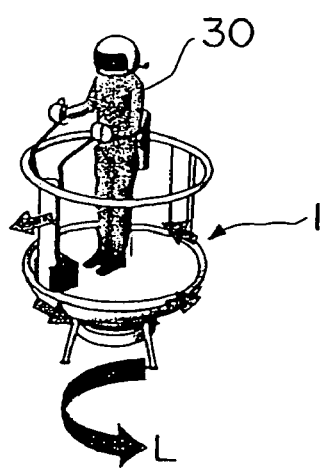
FIG. 28 is a perspective view showing the state in which the vertical takeoff and landing apparatus rotates in the counterclockwise direction.
Figure 29:
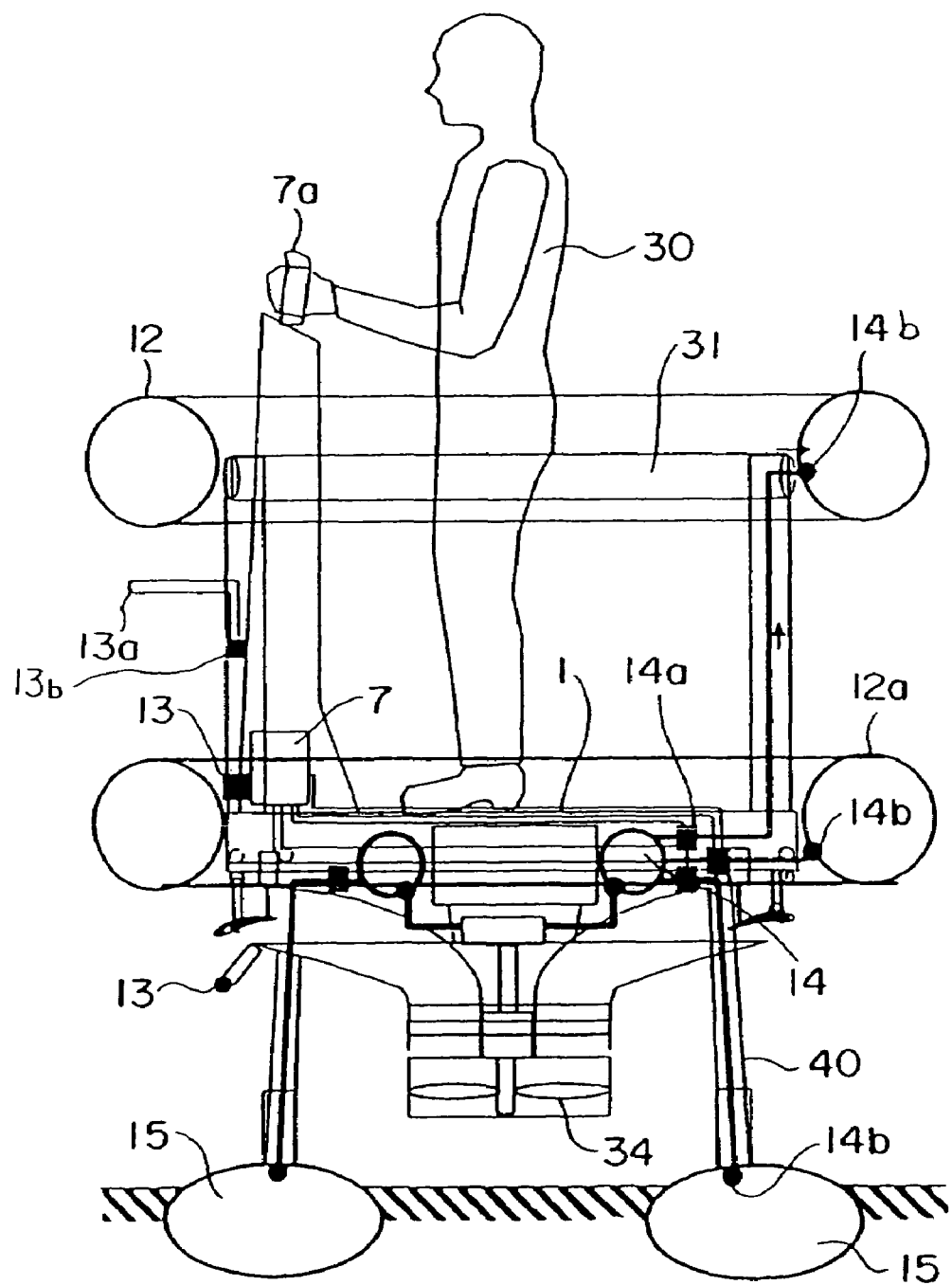
FIG. 29 is a cross sectional view showing a vertical takeoff and landing apparatus according to a third embodiment of the present invention.

Further, in order to make the airframe 1 turn right, each plate 8, which is ordinarily horizontal as shown in FIG. 23, is caused to tilt so as to place its right side higher than its left side, as shown in FIG. 24, by operating the right and left actuators 10 separately from each other. FIG. 23 is a view of the air intake port 4 when viewed from its front side. With such operations, the lift force K is angled or tilted, so that the airframe 1 starts to make a right turn in a direction indicated by arrow M, as shown in FIG. 25. On the contrary, in order to make the airframe 1 turn left, each plate 8, being ordinarily horizontal as shown in FIG. 26, is caused to tilt so as to place its left side higher than its right side, as shown in FIG. 27, by operating the right and left actuators 10 separately from each other. As a result, the lift force K is angled or tilted so that the airframe 1 starts to make a left turn in a direction indicated by arrow L, as shown in FIG. 28.

Embodiment 3

A third embodiment of the present invention will be described while referring to FIG. 29 through FIG. 33. In these figures, the same or corresponding parts of this embodiment as those of the above-mentioned first and second embodiments are identified by the same symbols while omitting an explanation thereof.

This embodiment relates to a structure to protect the pilot 30, and includes airbags 12, 12a, 15 attached to an outer side of the guard ring 31, the outside surface of the airframe 1, and tip ends of a plurality of legs 40 mounted on a lower surface of the airframe 1, respectively.

Figure 30:
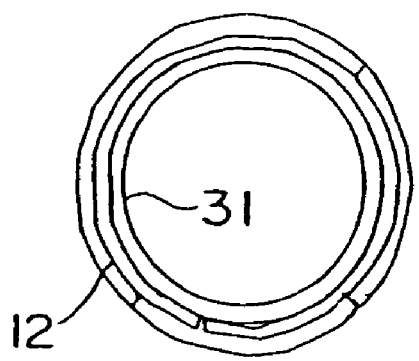
FIG. 30 is a plan view showing the state in which an airbag is received in a guard ring.
Figure 31:
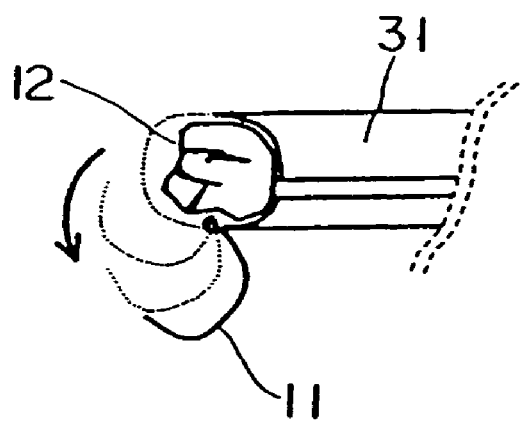
FIG. 31 is a cross sectional view showing the state in which the airbag is received in the guard ring.
Figure 32:
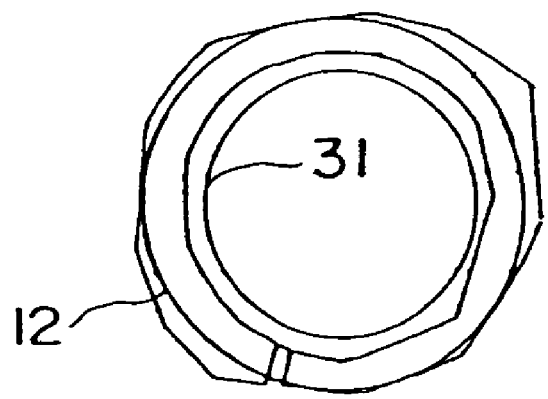
FIG. 32 is a plan view showing the state in which the airbag has been expanded.
Figure 33:
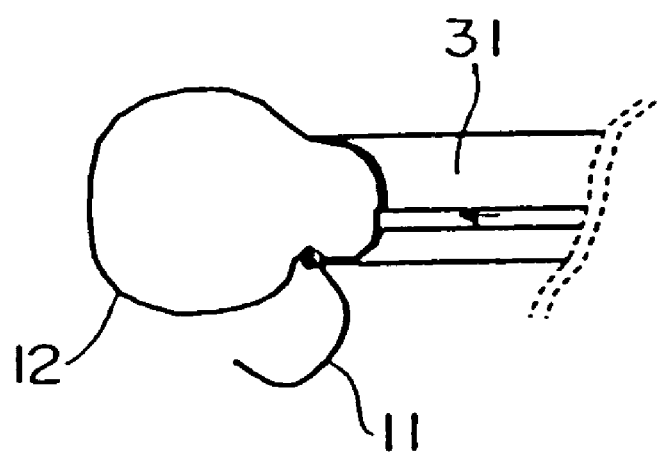
FIG. 33 is a cross sectional view showing the state in which the airbag has been expanded.

An annular storage member 11 arranged to surround the pilot 30 is mounted to the outer side of the guard ring 31. This storage member 11 comprises a cover of a semi-circular cross section for receiving therein the airbag 12, as shown in FIG. 31 and FIG. 33. FIG. 30 and FIG. 31 illustrate the state of the airbag 12 being received therein, i.e., being not expanded, whereas FIG. 32 and FIG. 33 illustrate the state of the airbag 12 being expanded. This airbag 12 may be formed of two or more divided pieces.

An acceleration sensor 13, a velocity sensor 13a and an approach or proximity sensor 13b are installed on the airframe 1 for generating output signals which are input to the control unit 7.

On the other hand, a gas generator 14 in the form of a high pressure tank is also attached to the airframe 1, and it is connected with the airbags 12, 12a, 15 through solenoid valves 14a, respectively. A pressure sensor 14b is arranged in each of the airbags 12, 12a, 15.

Here, when the control unit 7 determines, based on the output signals from the acceleration sensor 13, the velocity sensor 13a and the approach or proximity sensor 13b, that the posture of the airframe 1 or the rate of descent thereof comes to a dangerous state, it opens the solenoid valves 14a so as to supply a high pressure gas from the high pressure tank 14 to the respective airbags 12, 12a, 15, whereby the respective airbags 12, 12a, 15 are instantaneously expanded or inflated to alleviate an impact caused upon emergency landing or the like (FIG. 32 and FIG. 33). Upon opening or inflation of the airbags 12, 12a, 15, the storage member 11 is caused to automatically open, and each of the pressure sensors 14b in the airbags 12, 12a, 15 senses pressure shortage therein, so that the high pressure gas is additionally supplied from the high pressure tank 14 to the airbags which are short of pressure. With such an arrangement, the internal pressure in each airbag can be held constant, and hence even if the apparatus is forced to make emergency landing on the surface of the sea, etc., the airbags are caused to inflate again after having absorbed an impact upon the emergency landing, so that the airframe 1 can be made afloat on the surface of the sea.

Embodiment 4

Figure 34:
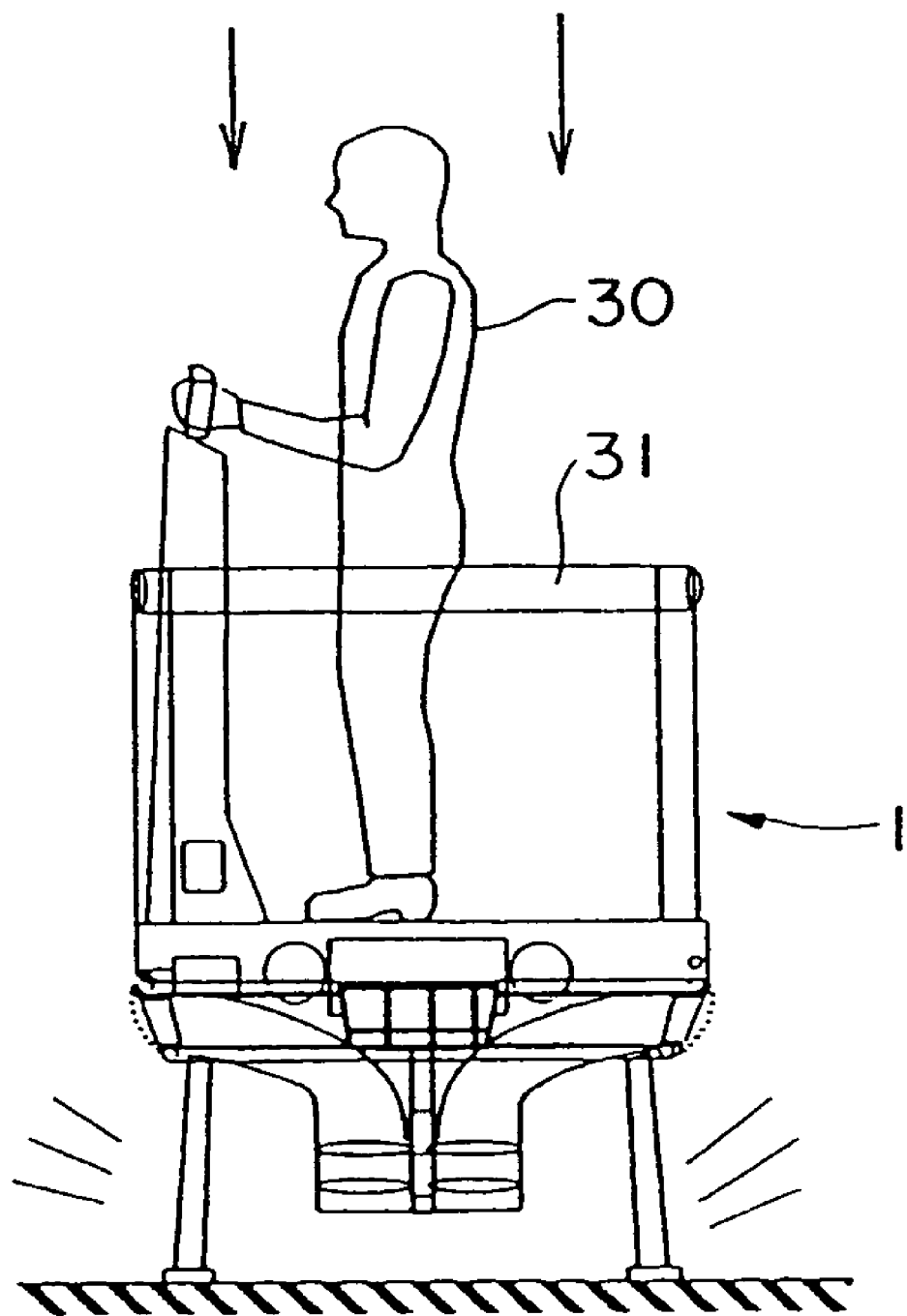
FIG. 34 is a side elevational view explaining advantageous effects of the vertical takeoff and landing apparatus according to the third embodiment.
Figure 35:
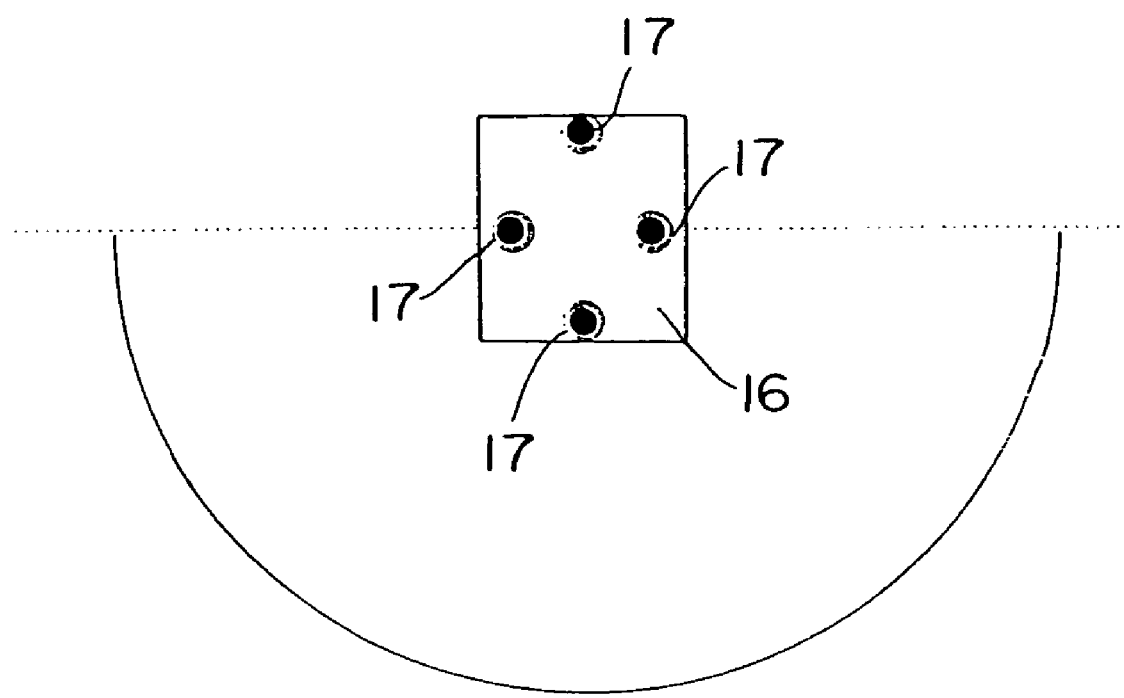
FIG. 35 is a view showing the structure of a variable support part of a fuel tank according to a fifth embodiment of the present invention.

If each of the airbags 15 attached at the tip ends of the legs 40 is formed of an airbag of a large capacity for exclusive use with landing, the cushioning performance of the airbags 15 to the airframe 1 and the pilot 30 at the time of landing can be improved, whereby it is possible to substantially reduce damage to the airframe 1 and the pilot 30 as compared with an airframe 1 provided with no airbag, as shown in FIG. 34.

Embodiment 5

A fifth embodiment of the present invention will be described while referring to FIG. 35 through FIG. 40. In these figures, the same or corresponding parts of this embodiment as those of the above-mentioned embodiments are identified by the same symbols while omitting an explanation thereof.

This embodiment is intended to make effective use of fuel and provide a stable fuel supply, and is suitable for a self-sustaining apparatus with a built-in engine.

A fuel tank 16 inside the airframe 1 is mounted to the other side of an upper surface 1a thereof so as to depend or hang down therefrom by means of a variable support part in the form of variable support members 17 at four places. In this connection, however, the fuel tank 16 may instead be mounted to the airframe 1 by the variable support members 17 at three places or at five or more places. The variable support members 17 support the held position of the fuel tank 16 in a variable manner and have the function of metering the weight of the fuel in the fuel tank 16.

That is, a motor 50 is fixedly secured to the airframe 1, and a male threaded rod 52 is extended from this motor 50. Screwed on the male threaded rod 52 is a female threaded nut or member 53 which is fixedly attached to the fuel tank 16 through a joint portion 54.

On the other hand, a rotary encoder 51 is mounted on the threaded rod 52 in a manner such that it is caused to rotate along with the threaded rod 52 in accordance with the rotation of the motor 50. A photo interrupter 55 is arranged so as to sandwich the rotary encoder 51, and an encoder output terminal 57 extends from this photo interrupter 55 to the control unit 7. A metering sensor (not shown) is mounted on the motor 50, and a metering sensor output terminal 56 comes out of the metering sensor, so that a signal from the metering sensor output terminal 56 is input to the control unit 7. In addition, a power supply terminal 58 extending from each motor 50 is connected to a power supply 60.

Figure 36:
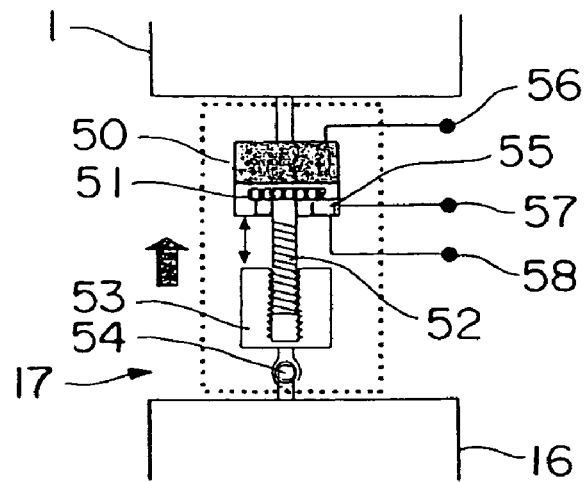
FIG. 36 is a view showing the state in which the variable support part of the fuel tank has been expanded.
Figure 37:
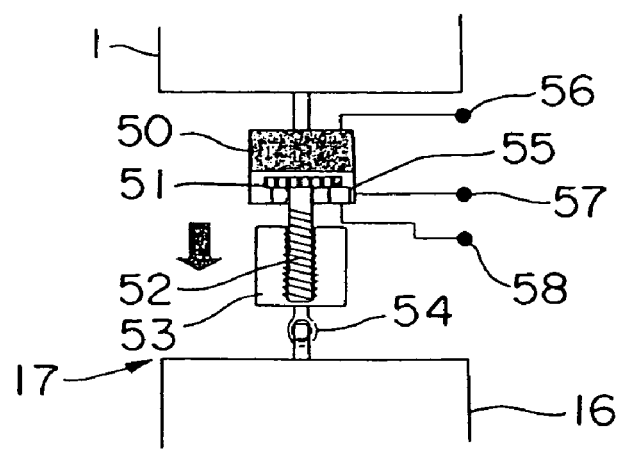
FIG. 37 is a cross sectional view showing the state in which the variable support part of the fuel tank has been contracted.
Figure 38:
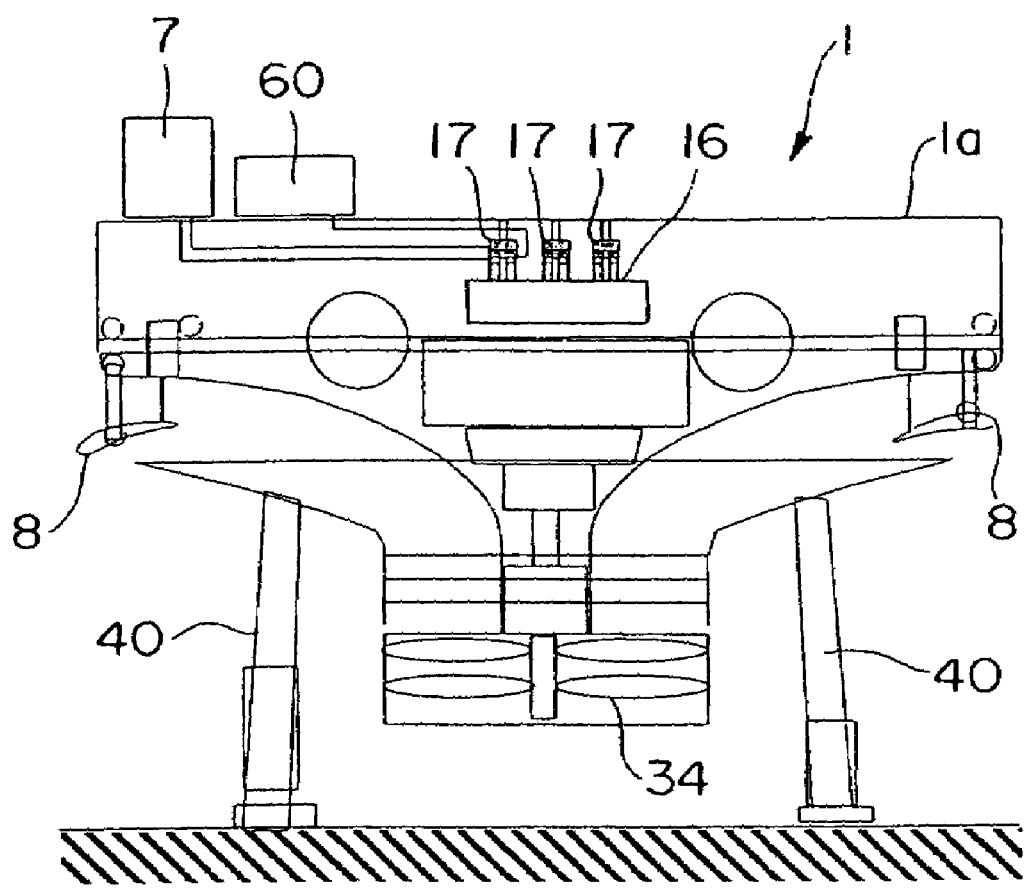
FIG. 38 is a schematic view showing the entire structure of the variable support part of the fuel tank.
Figure 39:
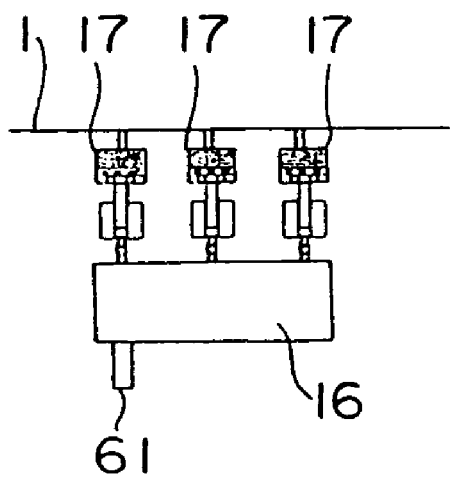
FIG. 39 is a view showing the state in which the fuel tank is maintained at its horizontal state.
Figure 40:
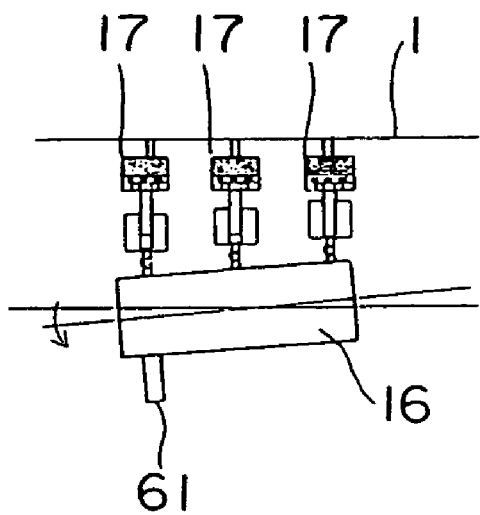
FIG. 40 is a view showing the state in which the fuel tank is tilted.
Figure 41:
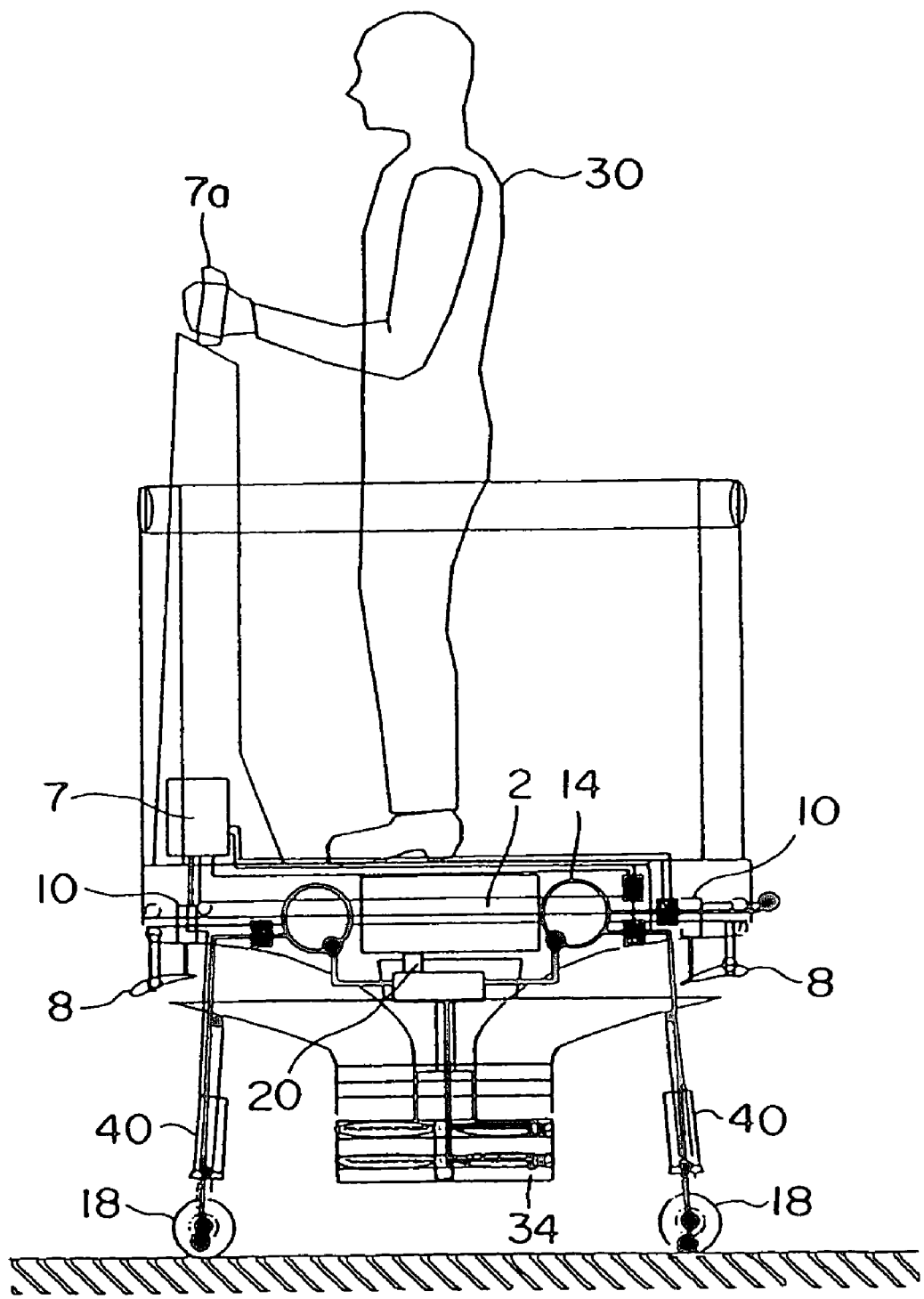
FIG. 41 is a view showing a vertical takeoff and landing apparatus according to a sixth embodiment of the present invention.

With the above arrangement, when a motor 50 is driven to rotate, the corresponding threaded rod 52 is caused to move linearly in the corresponding female threaded member 53 so that it is expanded and contracted with respect to the female threaded member 53 in directions indicated by thick black arrows in FIG. 36 and FIG. 37. Accordingly, the fuel tank 16 supported at four places can be tilted or inclined at an arbitrary angle, as shown in FIG. 39 and FIG. 40, so that the fuel in the fuel tank 16 can be moved to that side at which a fuel pipe 61 mounted on the fuel tank 16 is arranged.

With this arrangement, it is possible to fully use up the fuel in the fuel tank 16 while preventing the fuel from remaining in the fuel tank 16. In such a flying machine, there is a limit to its flight time, so the control and the effective use of fuel are extremely important. However, according to the above arrangement, the amount of remaining fuel can be accurately grasped, as a result of which it becomes easy to carry out flight control.

Embodiment 6

A sixth embodiment of the present invention will be described while referring to FIG. 41 through FIG. 44. In these figures, the same or corresponding parts of this embodiment as those of the above-mentioned embodiments are identified by the same symbols while omitting an explanation thereof.

This embodiment serves to enable the airframe 1 to travel even on the ground.

Figure 43:
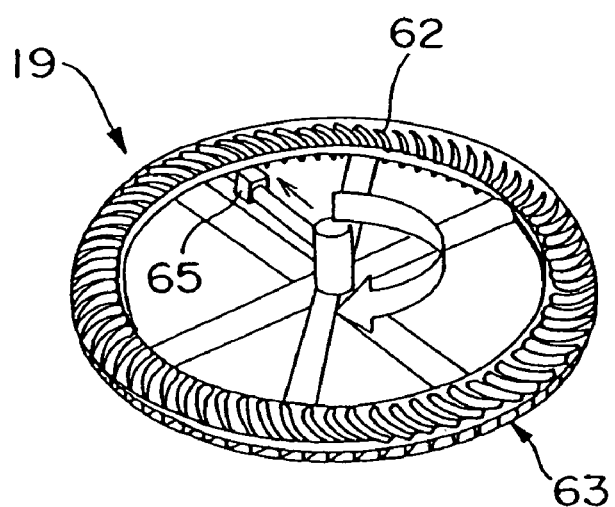
FIG. 43 is a perspective view showing the entire structure of the turbine.
Figure 44:
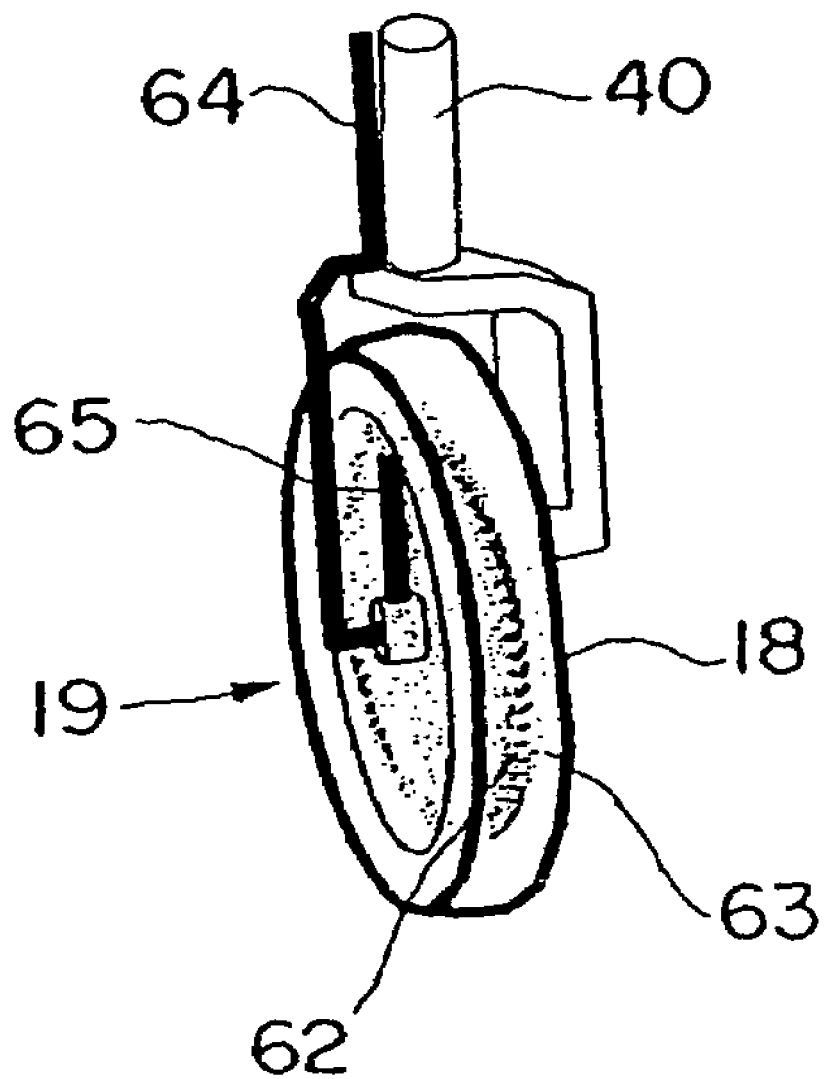
FIG. 44 is a perspective view showing a wheel part according to the sixth embodiment.

A wheel 18 is mounted on the tip end of each leg 40 attached to the lower surface of the airframe 1 so as to support it in such a manner that the airframe 1 can travel on the ground. A turbine 19 is coupled to an inner side of each wheel 18, and it has a first fin 62 and a second fin 63 formed in mutually different directions on the front and rear surfaces of a ring-shaped main body of the turbine 19, as shown in FIG. 43.

Figure 42:
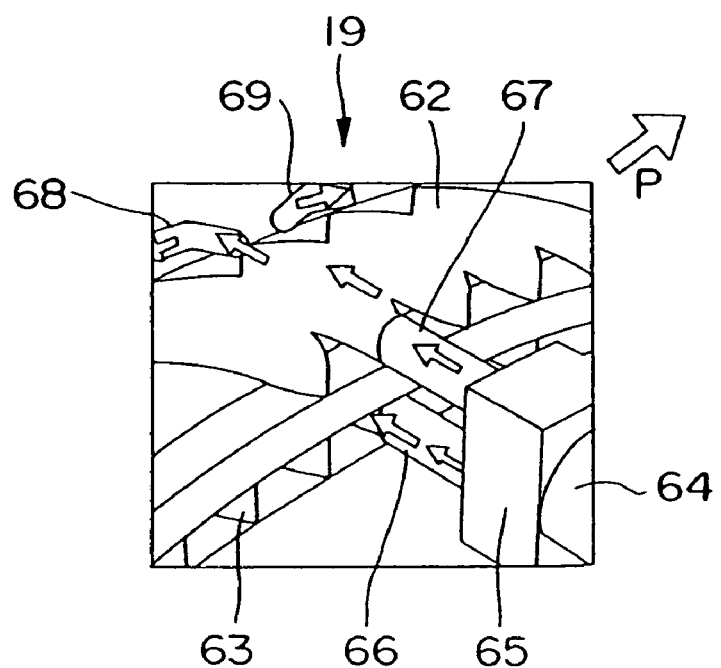
FIG. 42 is a perspective view showing essential portions of a turbine according to the sixth embodiment.

The propulsion device 2 in this embodiment comprises a turbo fan engine or a jet engine of the type capable of generating a high pressure gas, and includes a gas distribution system 20 for supplying the high pressure gas from the propulsion device 2 to each turbine 19. This gas distribution system 20 is introduced into a nozzle 65 in each wheel 18 through a high pressure pipe 64. Two injection parts 66, 67 extend from this nozzle 65 in such a manner that they are directed toward the fins 62, 63, respectively. The amounts of gas to be injected from these two injection parts 66, 67 can be individually adjusted, so the turbine 19 can be rotated in any of forward and reverse rotational directions by properly adjusting the injection amounts of the injection parts 66, 67, as shown in FIG. 42.

That is, when the gas is injected from the injection part 67 alone, it flows in a direction indicated at 68 thereby to cause the turbine 19 to rotate in a direction indicated by arrow P, whereas when the gas is injected from the injection part 66 alone, it flows in a direction indicated at 69 thereby to cause the turbine 19 to rotate in a direction opposite to the direction indicated by arrow P.

Thus, the wheels 18 can be rotated in either directions, and the apparatus according to this embodiment can both travel on the ground and float in the air. As a consequence, the airframe 1 becomes able to perform flying and ground traveling, thereby enlarging the operating range thereof.

Embodiment 7

A seventh embodiment of the present invention will be described while referring to FIG. 45 through FIG. 47. In these figures, the same or corresponding parts of this embodiment as those of the above-mentioned embodiments are identified by the same symbols while omitting an explanation thereof.

This embodiment serves to stabilize the airframe in close proximity to a building mainly at the time of a high-rise building disaster such as a building fire, etc.

That is, the legs 40 attached to the lower surface of the airframe 1 are held in a manner as to be extended in any of downward and side or lateral directions of the airframe 1, and the airframe 1 can be moved in a vertical direction while making the wheel 18 mounted on the tip end of a leg 40 in contact with a vertical wall 22 of a building or the like.

Figure 45:
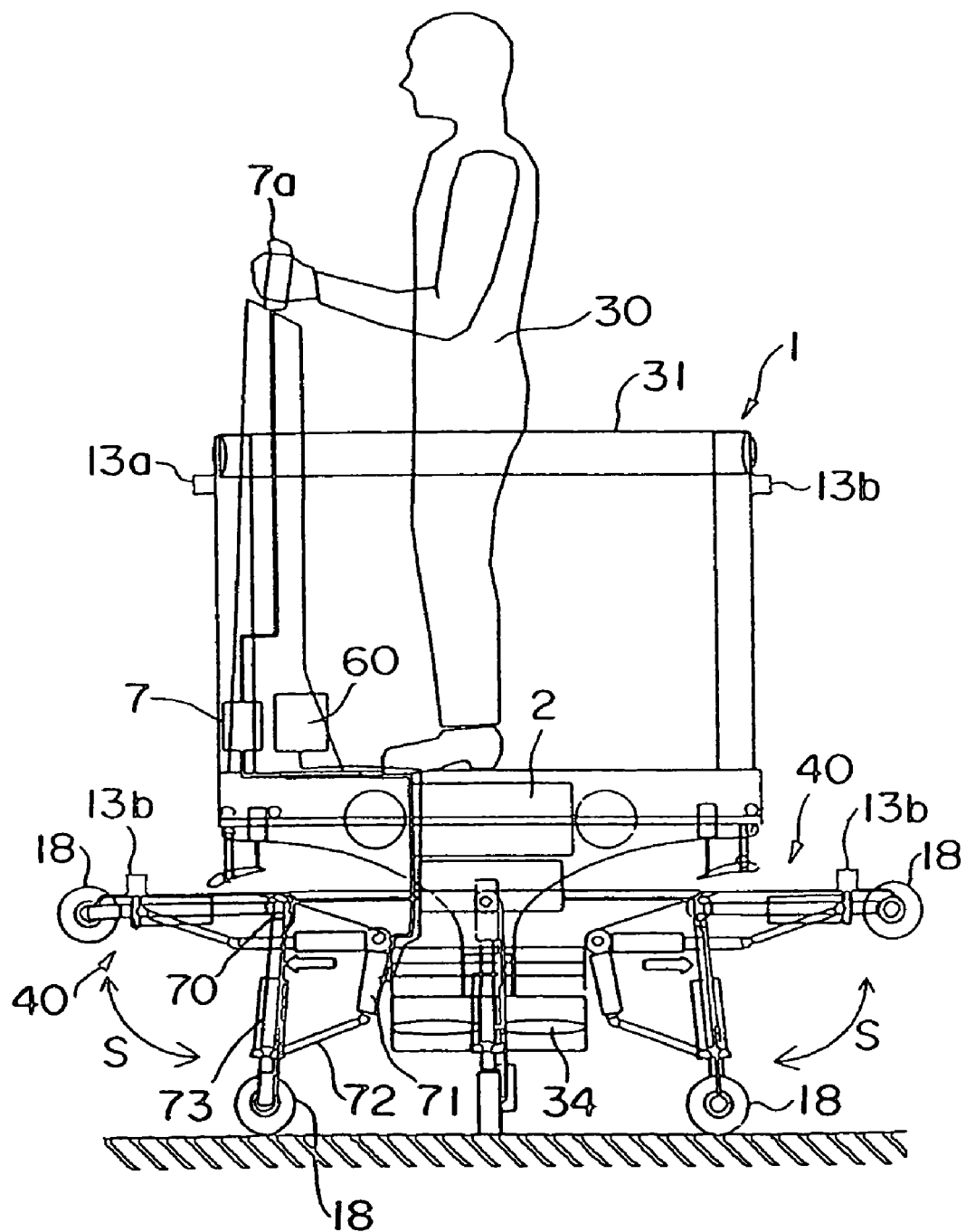
FIG. 45 is a cross sectional view showing a vertical takeoff and landing apparatus according to a seventh embodiment of the present invention.

The legs 40 are provided in a total of four pairs, and each comprises a leg member 73 with a shock absorber (hereinafter referred to as a shock absorber-equipped leg member) attached at its base end to the lower surface of the airframe 1 by means of a shaft 70, as shown in FIG. 45. Each shock absorber-equipped leg member 73 and the airframe 1 are connected with each other by means of an oleo-pneumatic shock absorber 71 and a rod 72, so that the shock absorber-equipped leg member 73 can be folded substantially at an angle of 90 degrees, as shown by arrow S in FIG. 45. The wheels 18, which have been described in the sixth embodiment, are mounted on the tip ends of the shock absorber-equipped leg members 73, respectively, so that when a shock absorber-equipped leg member 73 is brought into its horizontal position, it can be laterally or horizontally extended from the airframe 1 so as to be placed in contact with the vertical wall 22 of the building or the like.

Here, note that a high pressure gas, electric power or the like other than hydraulic pressure can of course be used as a driving source for each oleo-pneumatic shock absorber 71. In addition, approach or proximity sensors 13b are arranged around the legs 40 and the airframe 1, so that the distance from each leg 40 or the airframe 1 to the vertical wall 22 can be accurately measured.

Figure 46:
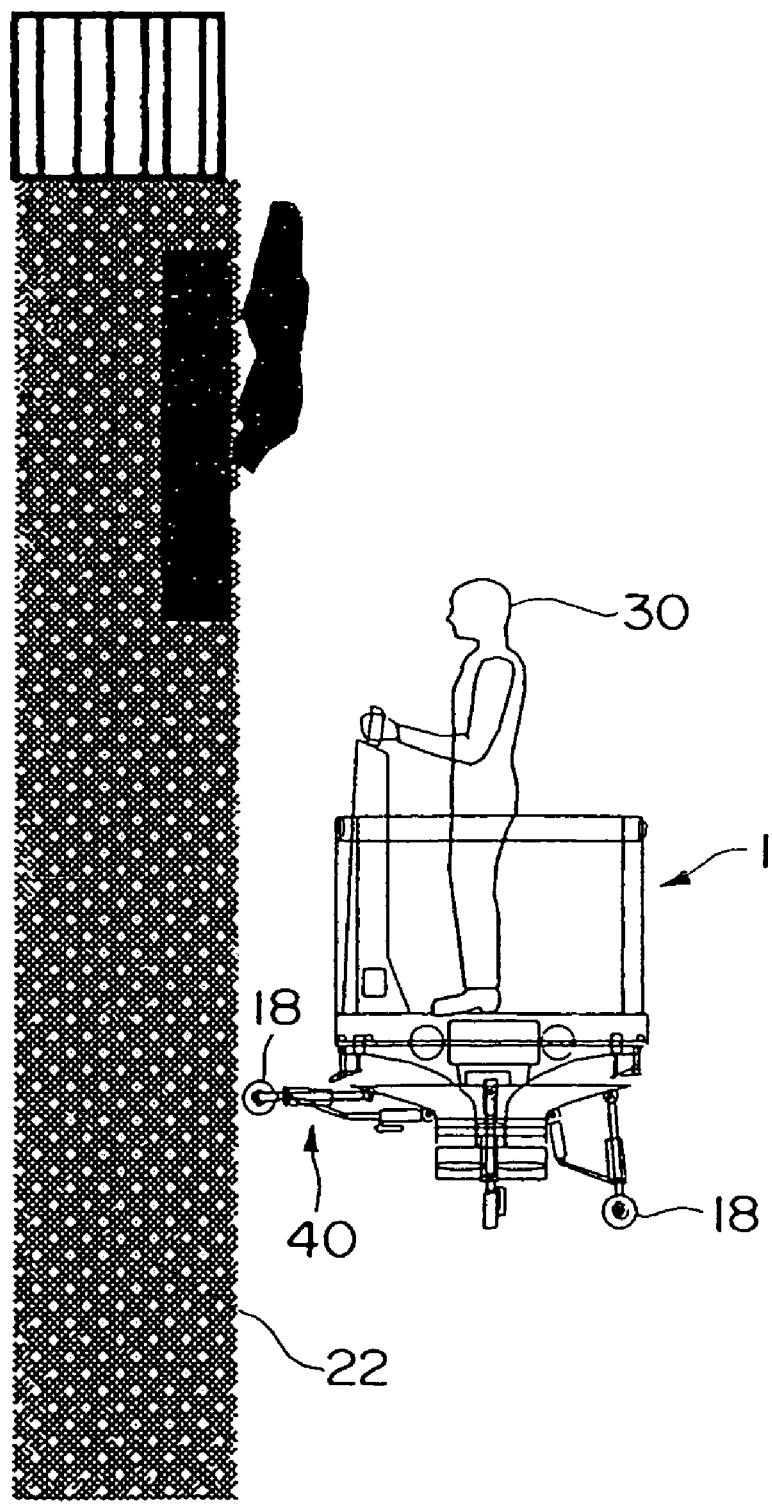
FIG. 46 is a side elevational view showing an example of the wall traveling of the vertical takeoff and landing apparatus according to the seventh embodiment.

According to the above arrangement, the apparatus can approach the building or the like up to such a distance as would be impossible to approach by hovering, as a result of which it is possible for the apparatus to go up and down along the vertical wall 22, as shown in FIG. 46, and hence the apparatus can move vertically along the wall of the building in a stable and reliable manner. Accordingly, rescue activities at disaster sites such as in particular fire sites, etc., can be easily conducted.

Figure 47:
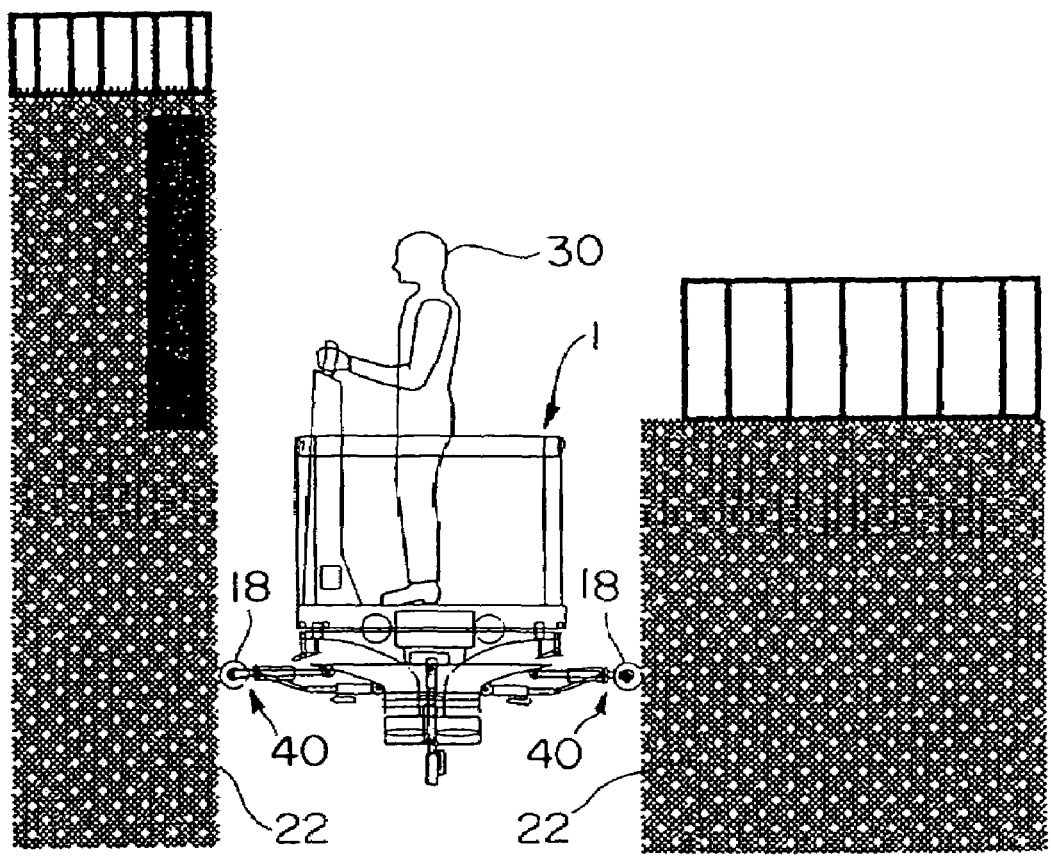
FIG. 47 is a side elevational view showing another example of the wall traveling of the vertical takeoff and landing apparatus according to the seventh embodiment.

FIG. 47 shows the case in which there exist vertical walls 22 before and behind the airframe 1, and in this case, a further stable flight posture or attitude of the airframe 1 can be maintained by laterally extending the forward and rearward legs 40 in contact with the fore and aft vertical walls 22, respectively. In such a case, there will be achieved an advantageous effect that driving the wheels 18 to rotate can serve to greatly reduce the load of the propulsion device 2.

Thus, if the wheels can be extended or projected from the airframe side surface, the apparatus can make extremely stable flight even in case of hovering near a building.

According to the present invention, the posture or attitude of the airframe can be controlled without any pilot's weight shift or body movement, so a flying machine excellent in the maneuverability and postural stability of the airframe can be provided. In addition, in the case of a flying machine equipped with airbags, it is possible to protect the pilot from the impact of an accident.

Moreover, it is also possible to prevent the pilot from being subject to a strong wind, thereby alleviating the resultant fatigue and/or stress during flight control operation.

While the invention has been described in terms of preferred embodiments, those skilled in the art will recognize that the invention can be practiced with modifications within the spirit and scope of the appended claims.

What is claimed is:

1. A vertical takeoff and landing apparatus comprising:
an airframe having an upper surface for supporting an aircraft operator, a propulsion device, comprising a turbine and a propeller connected to said turbine by a shaft, for generating propulsive force in a vertically upward direction, and a side wall surface surrounding said propulsion device, said side wall surface defining a periphery;
an air intake port having a plurality of divided air intake port sections formed on said side wall surface of said airframe at locations spaced about said periphery and below the upper surface;
a duct part connecting said air intake port sections and said propulsion device with one another, thereby providing external air to said propeller;
a plurality of shutter parts each provided at a corresponding one of said air intake port sections for adjusting an amount of air flowing therein; and
a control unit for variably adjusting the degree of opening of each of said shutter parts in accordance with an operation of a control stick.

2. A vertical takeoff and landing apparatus comprising:
an airframe having an upper surface for supporting an aircraft operator, a propulsion device, comprising a turbine and a propeller connected to said turbine by a shaft, for generating propulsive force in a vertically upward direction, and a side wall surface surrounding said propulsion device, said side wall surface defining a periphery;
an air intake port having a plurality of air intake port sections formed on said side wall surface of said airframe at locations spaced about said periphery and below the upper surface;
a duct part connecting said air intake port sections and said propulsion device with one another, thereby providing external air to said propeller;

a plurality of plates of an airfoil cross section each provided at a corresponding one of said air intake port sections for adjusting an amount of air flowing therein;

a plurality of pairs of support members each provided at both ends of a corresponding one of said plates for rotatably supporting the corresponding plate;

a plurality of pairs of actuators each for driving the both ends of a corresponding one of said plates thereby to individually make variable an angle of attack and an angle of tilt thereof; and a control unit for adjusting an amount of operation of each actuator in accordance with an operation of a control stick.

3. The vertical takeoff and landing apparatus as set forth in claim 1 or 2, further comprising:

an annular storage member disposed to surround an operator on the upper surface of said airframe;

an airbag received in said storage member;

a gas generator for generating a high pressure gas which is to be supplied to said airbag so as to inflate it;

a valve for controlling said high pressure gas to be supplied from said gas generator to said airbag; and a sensor for detecting the state of movement of said airframe and generating an output signal representative of the state of movement thus detected to said control unit;

wherein said control unit further controls said valve based on the output signal from said sensor in such a manner that said valve is opened to supply said high pressure gas to said airbag for inflation thereof.

4. The vertical takeoff and landing apparatus as set forth in claim 1 or 2, further comprising:

a landing airbag provided at a lower surface side of said airframe;

a gas generator for generating a high pressure gas which is to be supplied to said landing airbag so as to inflate it;

a valve for controlling said high pressure gas to be supplied from said gas generator to said landing airbag; and a sensor for detecting the state of movement of said airframe and generating an output signal representative of the state of movement thus detected to said control unit;

wherein said control unit further controls said valve based on the output signal from said sensor in such a manner that said valve is opened to supply said high pressure gas to said landing airbag for inflation thereof.

5. The vertical takeoff and landing apparatus as set forth in claim 1 or 2, further comprising:

a fuel tank attached to said airframe; and a variable support part for supporting a held position of said fuel tank at least three points in a variable manner;

wherein said control unit further controls said variable support part in such a manner that said fuel tank is held at an arbitrary angle so as to induce the fuel in said fuel tank to a specific position therein to facilitate the fuel supply.

6. The vertical takeoff and landing apparatus as set forth in claim 1 or 2, further comprising:

a fuel tank attached to said airframe; and a variable support part for supporting a held position of said fuel tank at least three points in a variable manner;

wherein said control unit further controls said variable support part in such a manner that said fuel tank is held at an arbitrary angle so as to induce the fuel in said fuel tank to a specific position therein to facilitate the fuel supply; and said variable support part further has a function of metering an amount of fuel in said fuel tank; and said control unit controls said variable support part based on the amount of fuel metered by said variable support part in such a manner that said fuel tank is held at an arbitrary angle.

7. The vertical takeoff and landing apparatus as set forth in claim 1 or 2, further comprising:

a plurality of wheels provided at a lower side of said airframe for supporting said airframe in a manner as to enable it to travel; and a plurality of turbines each attached to an inner side of a corresponding one of said wheels and adapted to be rotated by a gas supplied thereto to drive said wheels to rotate;

wherein said propulsion device comprises an engine of a type capable of generating a high pressure gas, and said apparatus further comprises a gas distribution system for distributing the high pressure gas from said propulsion device so as to supply it to said plurality of turbines.

8. The vertical takeoff and landing apparatus as set forth in claim 1 or 2, further comprising a plurality of wheels, and wheel holding and extending means for holding said plurality of wheels and extending them in any of downward and side directions relative to said airframe; and means for determining times when said airframe approaches a vertical wall external of said airframe, and for causing said wheels to project in the side direction relative to said airframe so as to be placed in contact with said vertical wall.

9. The vertical takeoff and landing apparatus as set forth in claim 1 or 2, wherein a high pressure gas is supplied to said turbine, whereby said turbine is driven to rotate said propeller thereby to generate propulsive force; and said external high pressure gas is supplied by a high pressure gas generator disposed outside said propulsion device, or a high pressure gas extracted from a jet engine or a detonation pulse engine.

10. The vertical takeoff and landing apparatus as set forth in claim 1 or 2, wherein an external high pressure gas is supplied to said turbine whereby said turbine is driven to rotate said propeller thereby to generate propulsive force; and streams of air sucked through said plurality of air intake port sections are merged with one another at a location upstream of said propeller.

11. The vertical takeoff and landing apparatus as set forth in claim 1 or 2, wherein said propulsion device comprises at least one of a jet engine, a turbo fan engine, a motor which is adapted to be driven to operate by means of a fuel cell and has a propeller or a fan coupled with its output shaft, and an internal combustion engine which has a propeller or a fan coupled with its output shaft.

12. The vertical takeoff and landing apparatus as set forth in claim 1 or 2, wherein each of said air intake port sections is covered with a net member.

* * * * *